United States Patent
Xu et al.

(10) Patent No.: US 12,143,329 B2
(45) Date of Patent: *Nov. 12, 2024

(54) TRACKING REFERENCE SIGNAL AVAILABILITY INDICATION

(71) Applicant: QUALCOMM Incorporated, San Diego, CA (US)

(72) Inventors: Huilin Xu, Temecula, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,490

(22) Filed: Jan. 24, 2023

(65) Prior Publication Data

US 2023/0163910 A1   May 25, 2023

Related U.S. Application Data

(63) Continuation of application No. 17/805,599, filed on Jun. 6, 2022, now Pat. No. 11,621,815.

(60) Provisional application No. 63/263,410, filed on Nov. 2, 2021.

(51) Int. Cl.
*H04W 72/04* (2023.01)
*H04L 5/00* (2006.01)
*H04W 68/00* (2009.01)
*H04W 76/00* (2018.01)
*H04W 88/08* (2009.01)

(52) U.S. Cl.
CPC ......... *H04L 5/0048* (2013.01); *H04W 68/005* (2013.01)

(58) Field of Classification Search
CPC ... H04L 5/0048; H04L 5/0051; H04L 5/0094; H04W 68/005; H04W 68/025
USPC .......................................................... 370/329
See application file for complete search history.

(56) References Cited

U.S. PATENT DOCUMENTS

| 11,621,815 B1* | 4/2023 | Xu ..................... H04L 5/0048 |
| | | 370/329 |
| 2018/0359071 A1* | 12/2018 | Lee ..................... H04L 7/0054 |
| 2023/0037852 A1* | 2/2023 | Islam ................... H04L 5/0094 |

FOREIGN PATENT DOCUMENTS

| CN | 108631987 A | 10/2018 |
| CN | 108112079 B | 4/2022 |
| WO | 2021163508 A1 | 8/2021 |
| WO | 2022152888 A1 | 7/2022 |

OTHER PUBLICATIONS

Panasonic (R1-2107623, Potential enhancements for TRS/CSI-RS occasion(s) for idle/inactive UEs, Aug. 16-27, 2021) (Year: 2021).*

(Continued)

*Primary Examiner* — Maharishi V Khirodhar
(74) *Attorney, Agent, or Firm* — Harrity & Harrity, LLP

(57) ABSTRACT

Various aspects of the present disclosure generally relate to wireless communication. In some aspects, a user equipment (UE) may receive configurations of a set of tracking reference signal (TRS) resource sets. The UE may receive an availability indication associated with one or more TRS resource sets from the set of TRS resource sets, and the availability indication is associated with one or more groups of TRS resource sets associated with the set of TRS resource sets. Numerous other aspects are described.

20 Claims, 10 Drawing Sheets

(56) References Cited

OTHER PUBLICATIONS

Ericsson (R1-2107999, "Provisioning of TRS occasions to Idle/Inactive UEs", Aug. 16-Aug. 27, 2021) (Year: 2021).*
Co-pending U.S. Appl. No. 17/805,599, filed Jun. 6, 2022, 66 pages.
Ericsson: "Provisioning of TRS Occasions to Idle/inactive UEs", 3GPP TSG RAN WG1 #106bis-e, R1-2110137, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 2, 2021, 16 Pages, XP052059073, p. 4-5.
International Search Report and Written Opinion—PCT/US2022/078520—ISA/EPO—Feb. 8, 2023.
Moderator (Samsung) : "Moderator Summary #4 on TRS/CSI-RS Occasion(s) for Idle/inactive UEs", 3GPP TSG RAN WG1 #106-e, R1-2110580, 3rd Generation Partnership Project, Mobile Competence Centre, 650, Route Des Lucioles, F-06921 Sophia-Antipolis Cedex, France, vol. RAN WG1, No. e-Meeting, Oct. 11,2021-Oct. 19, 2021, Oct. 19, 2021, 117 pages, XP052061635, Section 2.2.
Nokia, et al., "On RS Information to Idle/Inactive Mode UEs", 3GPP TSG RAN WG1 #106bis-e, R1-2110312, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 1, 2021, 20 Pages, XP052059245, p. 8-9.

\* cited by examiner

TRACKING REFERENCE SIGNAL AVAILABILITY INDICATION

CROSS-REFERENCE TO RELATED APPLICATION

This application is a continuation of U.S. patent application Ser. No. 17/805,599, filed Jun. 6, 2022, entitled "TRACKING REFERENCE SIGNAL AVAILABILITY INDICATION," which claims priority to U.S. Provisional Patent Application No. 63/263,410, filed on Nov. 2, 2021, entitled "TRACKING REFERENCE SIGNAL AVAILABILITY INDICATION," the contents of which are incorporated herein by reference in their entireties.

FIELD OF THE DISCLOSURE

Aspects of the present disclosure generally relate to wireless communication and to techniques and apparatuses for a tracking reference signal (TRS) availability indication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive configurations of a set of tracking reference signal (TRS) resource sets. The one or more processors may be configured to receive an availability indication associated with one or more TRS resource sets from the set of TRS resource sets, wherein the availability indication indicates whether TRS resource sets included in the one or more TRS resource sets are to be transmitted, and wherein the availability indication is associated with one or more groups of TRS resource sets associated with the set of TRS resource sets.

Some aspects described herein relate to a base station for wireless communication. The base station may include a memory and one or more processors coupled to the memory. The one or more processors may be configured to transmit a configuration, intended for one or more UEs, of a set of TRS resource sets. The one or more processors may be configured to transmit an availability indication associated with one or more TRS resource sets from the set of TRS resource sets, wherein the availability indication indicates whether TRS resource sets included in the one or more TRS resource sets are to be transmitted, and wherein the availability indication is associated with one or more groups of TRS resource sets associated with the set of TRS resource sets.

Some aspects described herein relate to a method of wireless communication performed by a UE. The method may include receiving configurations of a set of TRS resource sets. The method may include receiving an availability indication associated with one or more TRS resource sets from the set of TRS resource sets, wherein the availability indication indicates whether TRS resource sets included in the one or more TRS resource sets are to be transmitted, and wherein the availability indication is associated with one or more groups of TRS resource sets associated with the set of TRS resource sets.

Some aspects described herein relate to a method of wireless communication performed by a base station. The method may include transmitting a configuration, intended for one or more UEs, of a set of TRS resource sets. The method may include transmitting an availability indication associated with one or more TRS resource sets from the set of TRS resource sets, wherein the availability indication indicates whether TRS resource sets included in the one or more TRS resource sets are to be transmitted, and wherein the availability indication is associated with one or more groups of TRS resource sets associated with the set of TRS resource sets.

Some aspects described herein relate to a non-transitory computer-readable medium that stores a set of instructions for wireless communication by a UE. The set of instructions, when executed by one or more processors of the UE, may cause the UE to receive configurations of a set of TRS resource sets. The set of instructions, when executed by one or more processors of the UE, may cause the UE to receive an availability indication associated with one or more TRS resource sets from the set of TRS resource sets, wherein the availability indication indicates whether TRS resource sets included in the one or more TRS resource sets are to be transmitted, and wherein the availability indication is associated with one or more groups of TRS resource sets associated with the set of TRS resource sets.

Some aspects described herein relate to a non-transitory computer-readable medium that stores a set of instructions for wireless communication by a base station. The set of instructions, when executed by one or more processors of the base station, may cause the base station to transmit a configuration, intended for one or more UEs, of a set of TRS resource sets. The set of instructions, when executed by one or more processors of the base station, may cause the base station to transmit an availability indication associated with one or more TRS resource sets from the set of TRS resource sets, wherein the availability indication indicates whether TRS resource sets included in the one or more TRS resource sets are to be transmitted, and wherein the availability indication is associated with one or more groups of TRS resource sets associated with the set of TRS resource sets.

Some aspects described herein relate to an apparatus for wireless communication. The apparatus may include means for receiving configurations of a set of TRS resource sets. The apparatus may include means for receiving an availability indication associated with one or more TRS resource sets from the set of TRS resource sets, wherein the availability indication indicates whether TRS resource sets included in the one or more TRS resource sets are to be transmitted, and wherein the availability indication is associated with one or more groups of TRS resource sets associated with the set of TRS resource sets.

Some aspects described herein relate to an apparatus for wireless communication. The apparatus may include means for transmitting a configuration, intended for one or UEs, of a set of TRS resource sets. The apparatus may include means for transmitting an availability indication associated with one or more TRS resource sets from the set of TRS resource sets, wherein the availability indication indicates whether TRS resource sets included in the one or more TRS resource sets are to be transmitted, and wherein the availability indication is associated with one or more groups of TRS resource sets associated with the set of TRS resource sets.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
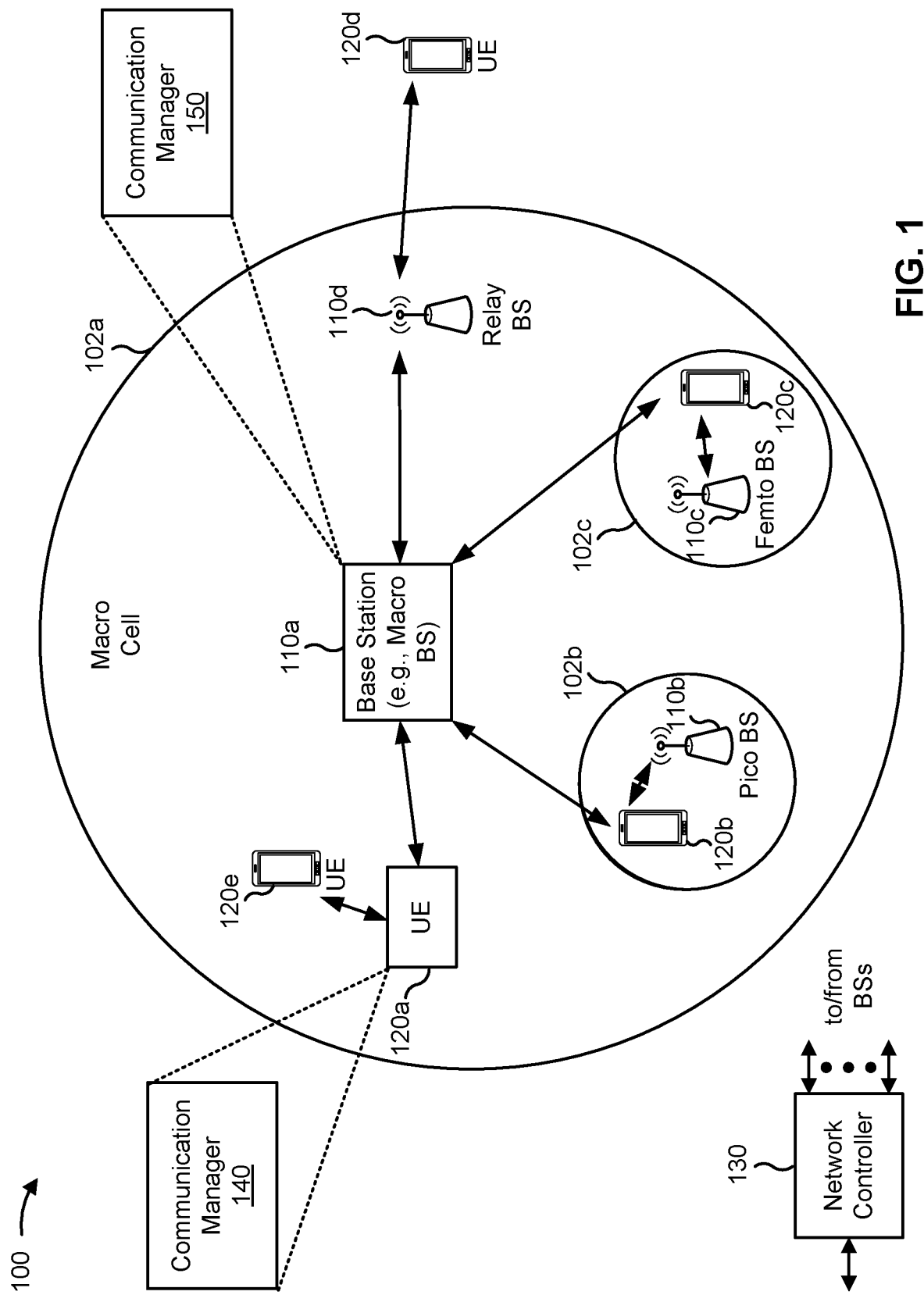
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the term "base station" (e.g., the base station 110) or "network node" or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (MC), or a Non-Real Time (Non-RT) MC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

In some aspects, the UE 120 may include a communication manager 140. As described in more detail elsewhere herein, the communication manager 140 may receive configurations of a set of tracking reference signal (TRS) resource sets; and receive an availability indication associated with one or more TRS resource sets from the set of TRS resource sets, where the availability indication indicates whether TRS resource sets included in the one or more TRS resource sets are to be transmitted, and where the availability indication is associated with one or more groups of TRS resource sets associated with the set of TRS resource sets. Additionally, or alternatively, the communication manager 140 may perform one or more other operations described herein.

In some aspects, the base station 110 may include a communication manager 150. As described in more detail elsewhere herein, the communication manager 150 may transmit configurations of a set of TRS resource sets; and transmit an availability indication associated with one or more TRS resource sets from the set of TRS resource sets, where the availability indication indicates whether TRS resource sets included in the one or more TRS resource sets are to be transmitted, and where the availability indication is associated with one or more groups of TRS resource sets associated with the set of TRS resource sets. Additionally, or alternatively, the communication manager 150 may perform one or more other operations described herein.

As indicated above, FIG. 1 is provided as an example. Other examples may differ from what is described with regard to FIG. 1.

Figure 2:
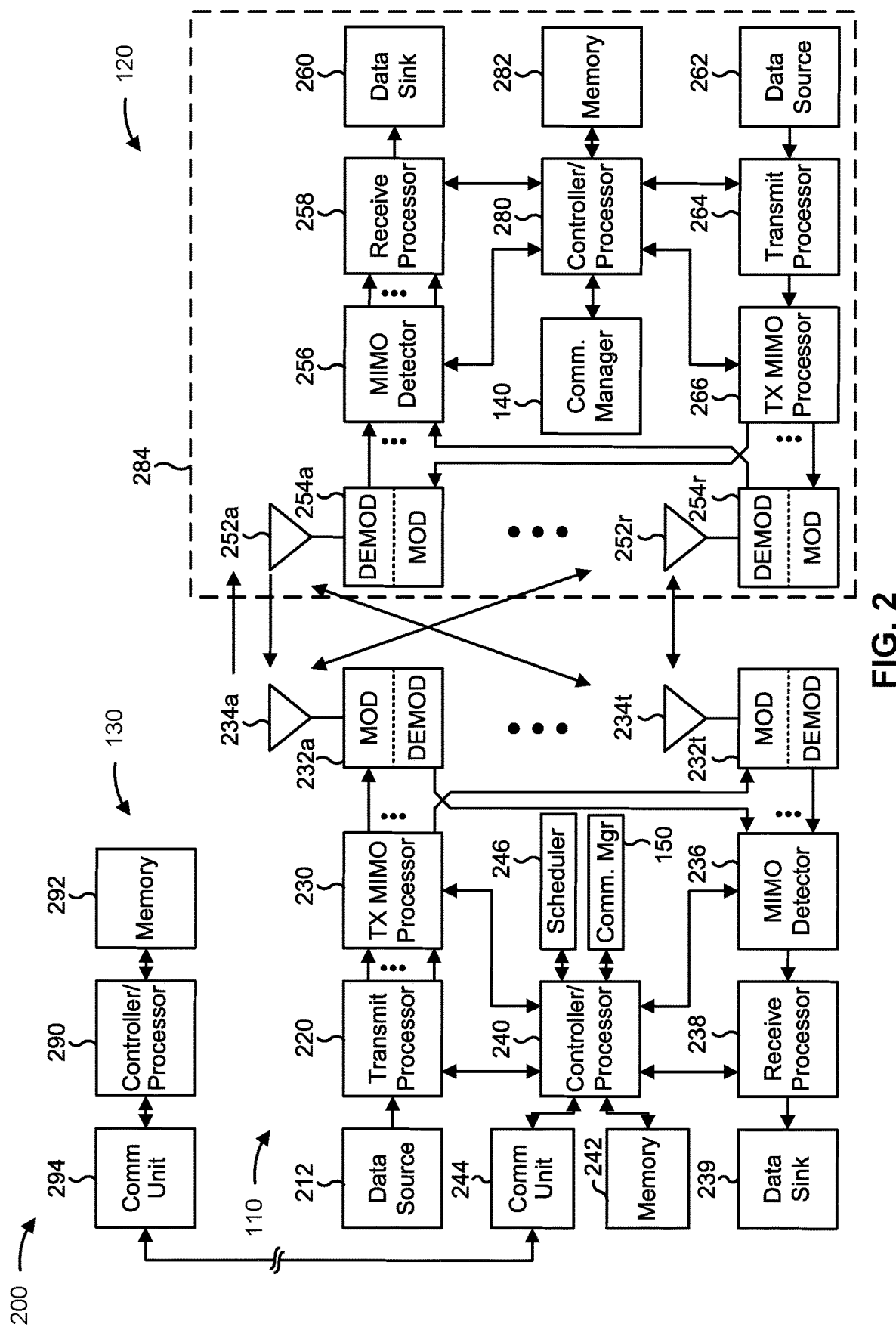
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the base station 110, the controller/processor 280 of the UE 120, and/or any other component(s) of FIG. 2 may perform one or more techniques associated with a TRS availability indication, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving configurations of a set of TRS resource sets; and/or means for receiving an availability indication associated with one or more TRS resource sets from the set of TRS resource sets, wherein the availability indication indicates whether TRS resource sets included in the one or more TRS resource sets are to be transmitted, and wherein the availability indication is associated with one or more groups of TRS resource sets associated with the set of TRS resource sets. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting configurations of a set of TRS resource sets; and/or means for transmitting an availability indication associated with one or more TRS resource sets from the set of TRS resource sets, wherein the availability indication indicates whether TRS resource sets included in the one or more TRS resource sets are to be transmitted, and wherein the availability indication is associated with one or more groups of TRS resource sets associated with the set of TRS resource sets. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), TRP, or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

Figure 3:
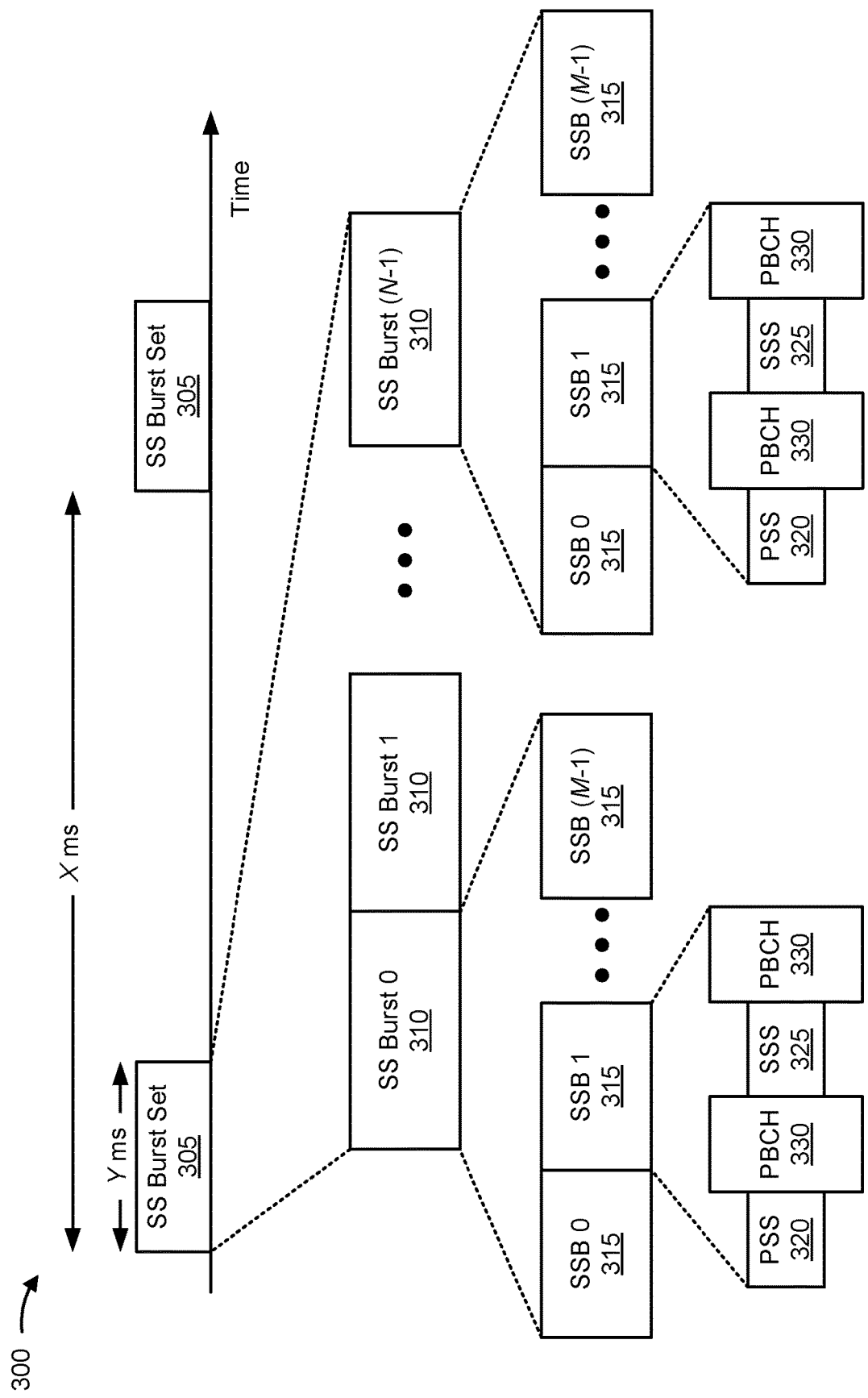
FIG. 3 is a diagram illustrating an example of a synchronization signal (SS) hierarchy, in accordance with the present disclosure.

FIG. 3 is a diagram illustrating an example 300 of a synchronization signal (SS) hierarchy, in accordance with the present disclosure. As shown in FIG. 3, the SS hierarchy may include an SS burst set 305, which may include multiple SS bursts 310, shown as SS burst 0 through SS burst N−1, where N is a maximum number of repetitions of the SS burst 310 that may be transmitted by the base station. As further shown, each SS burst 310 may include one or more SS blocks (SSBs) 315, shown as SSB 0 through SSB M−1, where M is a maximum number of SSBs 315 that can be carried by an SS burst 310. In some examples, different SSBs 315 may be beam-formed differently (e.g., transmitted using different beams), and may be used for cell search, cell acquisition, beam management, and/or beam selection (e.g., as part of an initial network access procedure). An SS burst set 305 may be periodically transmitted by a wireless node (e.g., base station 110), such as every X milliseconds, as shown in FIG. 3. In some examples, an SS burst set 305 may have a fixed or dynamic length, shown as Y milliseconds in FIG. 3. In some cases, an SS burst set 305 or an SS burst 310 may be referred to as a discovery reference signal (DRS) transmission window or an SSB measurement time configuration (SMTC) window.

In some examples, an SSB 315 may include resources that carry a PSS 320, an SSS 325, and/or a physical broadcast channel (PBCH) 330. In some examples, multiple SSBs 315 are included in an SS burst 310 (e.g., with transmission on different beams), and the PSS 320, the SSS 325, and/or the PBCH 330 may be the same across each SSB 315 of the SS burst 310. In some examples, a single SSB 315 may be included in an SS burst 310. In some examples, the SSB 315 may be at least four symbols (e.g., OFDM symbols) in length, where each symbol carries one or more of the PSS 320 (e.g., occupying one symbol), the SSS 325 (e.g., occupying one symbol), and/or the PBCH 330 (e.g., occupying two symbols). In some examples, an SSB 315 may be referred to as an SS/PBCH block.

In some examples, the symbols of an SSB 315 are consecutive, as shown in FIG. 3. In some examples, the symbols of an SSB 315 are non-consecutive. Similarly, in some examples, one or more SSBs 315 of the SS burst 310 may be transmitted in consecutive radio resources (e.g., consecutive symbols) during one or more slots. Additionally, or alternatively, one or more SSBs 315 of the SS burst 310 may be transmitted in non-consecutive radio resources.

In some examples, the SS bursts 310 may have a burst period, and the SSBs 315 of the SS burst 310 may be transmitted by a wireless node (e.g., base station 110) according to the burst period. In this case, the SSBs 315 may be repeated during each SS burst 310. In some examples, the SS burst set 305 may have a burst set periodicity, whereby the SS bursts 310 of the SS burst set 305 are transmitted by the wireless node according to the fixed burst set periodicity. In other words, the SS bursts 310 may be repeated during each SS burst set 305.

In some examples, an SSB 315 may include an SSB index, which may correspond to a beam used to carry the SSB 315. A UE 120 may monitor for and/or measure SSBs 315 using different receive (Rx) beams during an initial network access procedure and/or a cell search procedure, among other examples. Based at least in part on the monitoring and/or measuring, the UE 120 may indicate one or more SSBs 315 with a best signal parameter (e.g., an RSRP parameter) to a base station 110. The base station 110 and the UE 120 may use the one or more indicated SSBs 315 to select one or more beams to be used for communication between the base station 110 and the UE 120 (e.g., for a random access channel (RACH) procedure). Additionally, or alternatively, the UE 120 may use the SSB 315 and/or the SSB index to determine a cell timing for a cell via which the SSB 315 is received (e.g., a serving cell).

Beamforming may be used for communications between a UE and a base station, such as for millimeter wave communications and/or the like. In such a case, the base station may provide the UE with a configuration of transmission configuration indicator (TCI) states that respectively indicate beams that may be used by the UE, such as for receiving a physical downlink shared channel (PDSCH). The base station may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a channel state information (CSI) reference signal (CSI-RS) (e.g., an NZP-CSI-RS-ResourceId, an SSB-Index, and/or the like), and/or the like. Spatial relation information may similarly indicate information associated with an uplink beam.

For example, an SSB beam (e.g., an SSB index) may serve as a QCL source reference signal for one or more other signals, such as a CSI-RS, a TRS, and/or other signals. For example, a UE may use an SSB beam (e.g., an SSB index) to obtain QCL information that is used by the UE to receive a TRS. In other words, a TRS may be transmitted (e.g., by the base station) using a same beam as the SSB, and the UE may use the SSB to obtain QCL information to be used to receive the TRS.

As indicated above, FIG. 3 is provided as an example. Other examples may differ from what is described with regard to FIG. 3.

Figure 4:
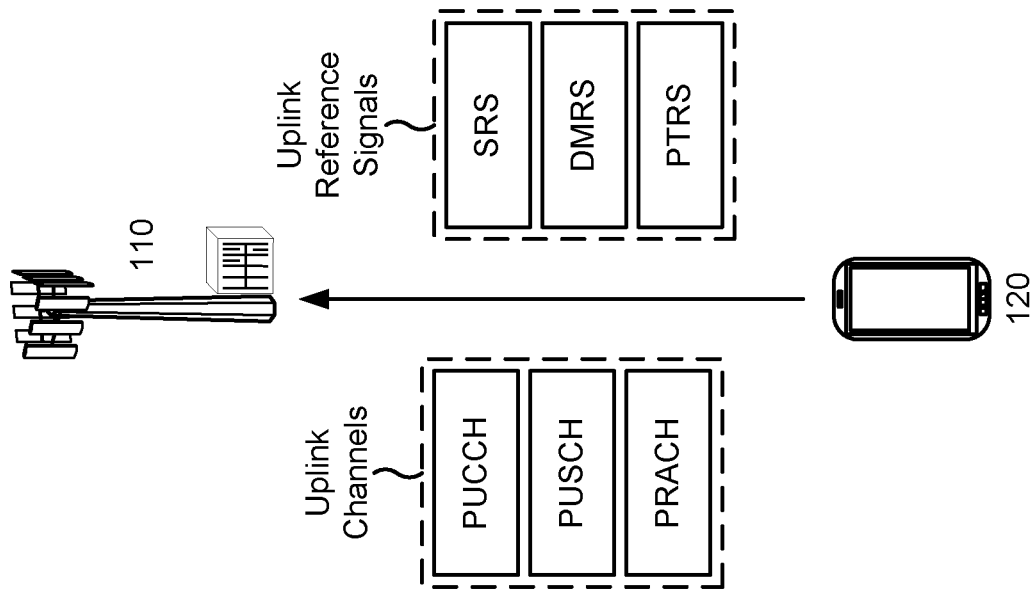
FIG. 4 is a diagram illustrating an example of physical channels and reference signals in a wireless network, in accordance with the present disclosure.
Figure 4:
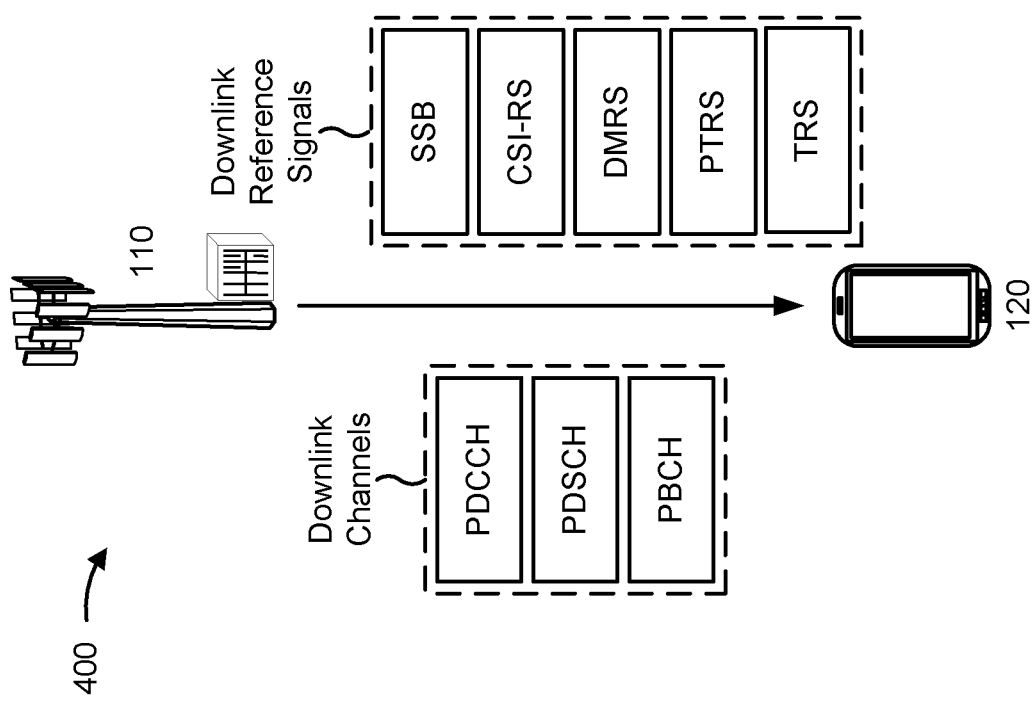

FIG. 4 is a diagram illustrating an example 400 of physical channels and reference signals in a wireless network, in accordance with the present disclosure. As shown in FIG. 4, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a PDSCH that carries downlink data, or a PBCH that carries system information, among other examples. In some examples, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some examples, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include an SSB, a CSI-RS, a DMRS, a positioning reference signal (PRS), a phase tracking reference signal (PTRS), and/or a TRS, among other examples. As also shown, an uplink reference signal may include an SRS, a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some examples, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some examples, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

A TRS is a downlink signal that may be used to perform time synchronization or frequency synchronization with an area, or to perform other tracking in order to receive communications in the area. The UE may receive the TRS and may compare the resources on which the TRS is received to resources on which the TRS was expected to be received to perform time and frequency synchronization and tracking. For example, a UE may use the TRS to update a tracking loop, which tracks changes to a frame timing of the network and an estimated time of arrival (TOA) of signals to be received by the UE. The UE may use the tracking loop updated by TRSs to perform operations quickly when transitioning from an idle or inactive state to a connected state. The base station may utilize the TRS to communicate with the UE. The base station may transmit a radio resource control (RRC) message to a connected UE (e.g., a UE operating in an RRC state of RRC_CONNECTED). The RRC message may include configuration information for the TRS, or a TRS configuration. The UE may receive the RRC message and may store the TRS configuration. The UE may perform an action causing phase discontinuity, such as bandwidth part (BWP) switching, BWP activation, carrier aggregation, cell activation (e.g., secondary cell activation), multi-TRP switching, multi-panel switching, and/or beam changing, among other examples, where the UE uses the TRS for fast synchronization and fine time/frequency tracking. In some examples, the UE may use a TRS for automatic gain control (AGC) operations.

As indicated above, FIG. 4 is provided as an example. Other examples may differ from what is described with regard to FIG. 4.

A UE may be configured to operate in one of at least three RRC states. For example, a UE may operate in a connected state (e.g., an RRC_CONNECTED) mode where the UE is connected to the wireless network (e.g., in both the control and user planes) through the base station. That is, a UE in an RRC connected mode may have an access stratum (AS) context stored in the RAN, the UE may belong to a specific cell, the UE may communicate unicast data, and the RAN may control mobility of the UE. In an inactive state (e.g., an RRC_INACTIVE mode), the UE may have an RRC context established with the base station or a core network connection established, but no data transfer is possible from the UE. The UE may still be able to receive paging initiated by the RAN and receive a broadcast of system information. In an idle state (e.g., an RRC_IDLE mode), where RRC context and base station or core network connections are not established, no data transfer is possible from the UE. The UE may still be able to receive a broadcast of system information when operating in the RRC idle mode.

A TRS may be configured to help a UE save power. In some examples, one or more TRS resources and/or one or more TRS resource sets may be configured for the UE. As used herein, "TRS resource" refers to a set of time domain resources and/or frequency domain resources in which a TRS may be transmitted by the base station. For example, a TRS resource may be associated with a QCL reference (e.g., an SSB index), a time domain resource allocation, and/or a frequency domain resource allocation, among other examples. As used herein, "TRS resource set" may refer to one or more TRS resources that are associated with one or more common configuration parameters (e.g., the TRS resources may all be associated with the one or more common configuration parameters). For example, TRS resources included in a TRS resource set may be associated with a common QCL reference (e.g., a common SSB index), a common time domain starting location (e.g., a common first OFDM symbol in the time domain), a common frequency domain resource allocation, a common starting resource block (RB), a common number of RBs, one or more common power control parameters, and/or a common periodicity and offset, among other examples. For example, a common QCL reference (e.g., a common SSB index or a common SSB beam) may be configured for each TRS resource set, such that each TRS resource included in the TRS resource set uses the same QCL reference. Configuring TRS resource sets may reduce a configuration signaling overhead that would have otherwise been used to separately configure each TRS resource included in the TRS resource set.

In some cases, UEs operating in an idle state or an inactive state may use SSBs transmitted by a base station for radio resource management (RRM) measurements, to update a tracking loop, and/or to perform AGC operations, among other examples. However, SSB transmissions by the base station may be sparse (e.g., SSBs may be transmitted by the base station with a relatively large periodicity). Therefore, in some cases, a base station may transmit a TRS to a UE when the UE is in an idle or inactive state to supplement the SSBs for RRM measurements, tacking loop updates, and/or AGC operations, among other examples. The TRS configuration information received by the UE may indicate the resources on which the base station may transmit the TRS. For example, a UE operating in an idle state or an inactive state may use a TRS transmitted by the base station for RRM measurements, tacking loop updates, and/or AGC operations, among other examples.

However, a TRS may not be a dedicated resource for UEs operating in an idle state or an inactive state. In other words, TRSs received and/or measured by the UEs operating in an idle state or an inactive state may not be specifically configured for those UEs. For example, the network (e.g., the base station) may configure TRS resources and/or TRS resources based at least in part on UEs operating in a connected state (e.g., based at least in part on UEs that are communicating with the base station in the connected state). In other words, if no UEs that are operating in a connected mode require a TRS to be transmitted by the base station, then the base station may not transmit any TRSs.

The base station may indicate configuration information for TRSs in a broadcast signal, such as a system information block (SIB), to enable UEs operating in an idle state or an inactive state to use the TRSs (e.g., indicated by the configuration information) for RRM measurements, tacking loop updates, and/or AGC operations, among other examples. As described above, the network (e.g., the base station) may dynamically determine whether to transmit configured TRSs. However, the configuration of TRSs may be a static configuration (e.g., may be indicated in system information or a SIB). Therefore, dynamically updating the configuration information to indicate TRSs that will be transmitted by the base station (e.g., dynamically updating the SIB to reconfigure TRS resources or TRS resource sets that will actually be transmitted by the base station) may be associated with overhead and/or significant delay or latency (e.g., because the configuration is a static configuration).

Therefore, the base station may transmit a TRS availability indication that indicates, from a set of configured TRS resources or a set of configured TRS resource sets, which TRSs are to be transmitted by the base station. The TRS availability indication may be a Layer 1 (L1) (e.g., a physical (PHY) layer) signal. For example, the TRS availability indication may be a paging signal. In some examples, the TRS availability indication may be transmitted via the PDCCH. The TRS availability indication signaling may be a paging PDCCH signal and/or a paging early indication (PEI) signal, among other examples. A PEI signal may function as a wake-up signal (WUS) for the idle state or the inactive state. For example, the PEI signal may indicate whether a UE is to receive a paging signal (e.g., before a paging occasion associated with the paging signal). The TRS availability indication may be included in reserved bits (e.g., reserved as defined, or otherwise fixed, by a wireless communication standard, such as the 3GPP) of a paging PDCCH signal. For example, the TRS availability indication signal may include separate indications for each of the configured TRS resources or each of the configured TRS resource sets. For example, a TRS availability indication signal may include a first indication that indicates whether a first TRS resource or a first TRS resource set is to be transmitted by the base station, a second indication that indicates whether a second TRS resource or a second TRS resource set is to be transmitted by the base station, a third indication that indicates whether a third TRS resource or a third TRS resource set is to be transmitted by the base station, and so on. In some examples, a TRS availability indication signal may include an indication of whether a TRS resource or TRS resource set is available (e.g., transmitted by the base station) or unavailable (e.g., not transmitted by the base station).

However, a size of the TRS availability indication (e.g., a number of information bits available to convey the TRS availability indication) may be limited or restricted. For example, the TRS availability indication may be included in a paging signal that is associated with conveying other information (e.g., in addition to the TRS availability indication). A size (e.g., a number of bits) for the Layer 1 signal (e.g., the paging signal) may be defined, or otherwise fixed, by a wireless communication standard, such as the 3GPP. As a result, without increasing the size of the Layer 1 signal, a TRS availability indication may be limited or restricted. For example, the TRS availability indication may be included in reserved bits of a PDCCH paging signal (e.g., which may be associated with a size of 6 bits, as defined, or otherwise fixed, by a wireless communication standard, such as the 3GPP) or in additional bits of a PEI signal (e.g., which may be associated with a size of less than or equal to 32 bits, as defined, or otherwise fixed, by a wireless communication standard, such as the 3GPP). In some cases, the available size of the TRS availability indication (e.g., in the Layer 1 signal) may not be sufficient to convey an availability indication for each configured TRS resource or for each configured TRS resource set. For example, a TRS may be configured for each SSB beam. In some wireless networks, up to 64 SSB beams may be configured (e.g., and therefore up to 64 TRS resources or TRS resource sets may be configured). Therefore, the Layer 1 signaling used to transmit the TRS availability indication may have an insufficient size to convey an availability for each configured TRS resource or for each configured TRS resource set.

Some techniques and apparatuses described herein enable enhanced TRS availability indications. For example, a UE may receive configurations of a set of TRS resources or a set of TRS resource sets. The UE may receive an availability indication associated with one or more TRS resources or one or more TRS resource sets from the set of TRS resources or the set of TRS resource sets. The availability indication indicates whether TRS resources or TRS resource sets included in the one or more TRS resources or the one or more TRS resource sets are to be transmitted by the base station. In some aspects, the availability indication may be associated with one or more groups of TRS resources, associated with the set of TRS resources, or one or more groups of TRS resource sets associated with the set of TRS resource sets. In some aspects, the availability indication may be associated with a subset of TRS resources, from the set of TRS resources, or a subset of TRS resource sets from the set of TRS resource sets.

As a result, a base station may be enabled to transmit, and a UE may be enabled to receive, a TRS availability indication for the set of TRS resources or the set of TRS resource sets in a signal that is associated with a limited or restricted available size for the TRS availability indication. For example, a group, from the one or more groups of TRS resources or the one or more groups of TRS resource sets, may indicate an availability for TRS resources or TRS resource sets included in the group using a single indication (e.g., a single bit). As another example, the availability indication may indicate availabilities for the subset of TRS resources or the subset of TRS resource sets and an availability of remaining TRS resources (e.g., from the set of TRS resources) or remaining TRS resource sets (e.g., from the set of TRS resource sets) may be assumed by the UE (e.g., as available or unavailable). Therefore, a size associated with the TRS availability indication may be reduced.

Figure 5:
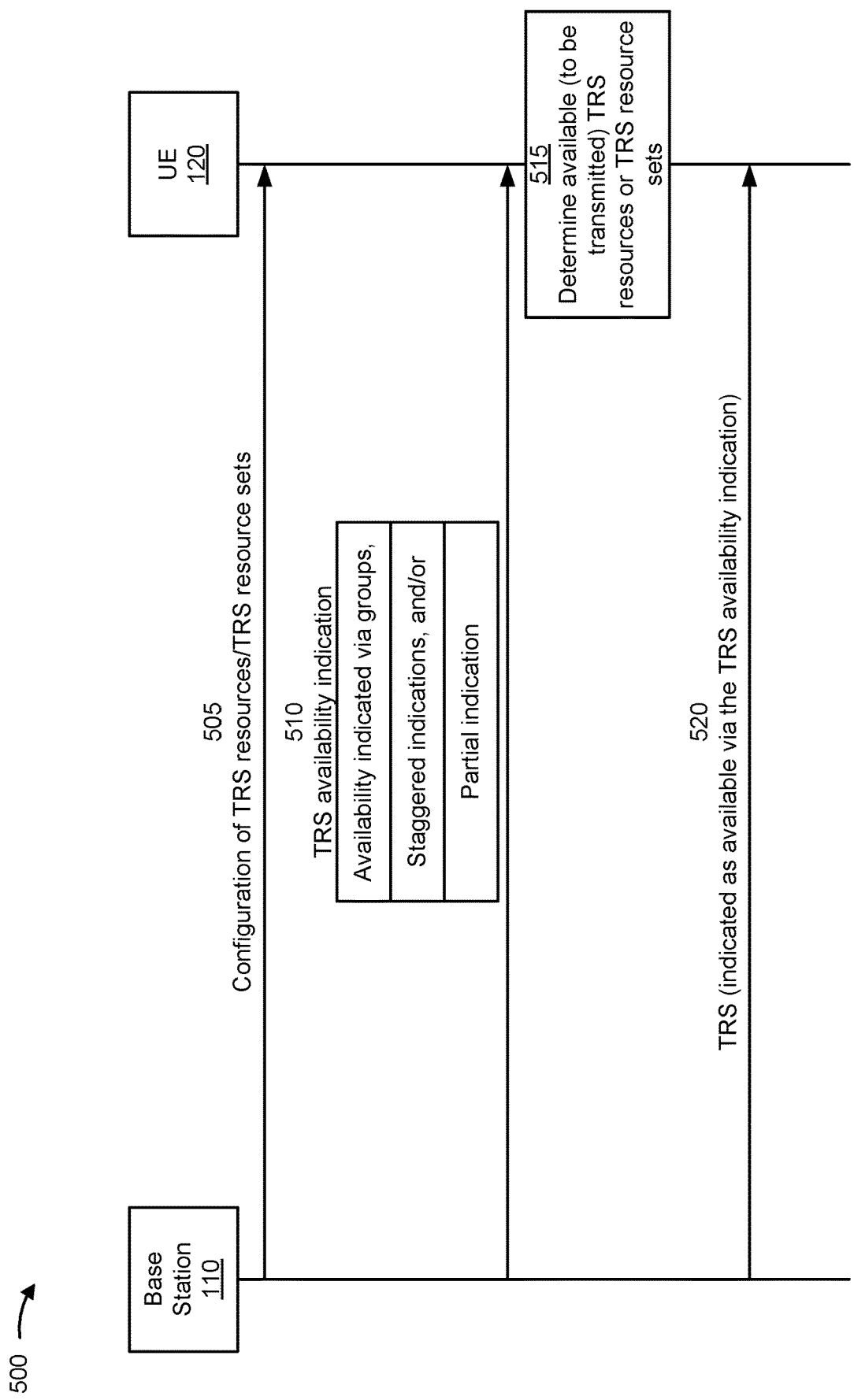
FIG. 5 is a diagram illustrating an example associated with tracking reference signal (TRS) availability indications, in accordance with the present disclosure.

FIG. 5 is a diagram illustrating an example 500 associated with TRS availability indications, in accordance with the present disclosure. As shown in FIG. 5, a base station 110 and a UE 120 may communicate with one another in a wireless network, such as the wireless network 100.

As shown by reference number 505, the base station 110 may transmit, and the UE 120 may receive, configuration information. In some aspects, the UE 120 may receive configuration information from another device (e.g., from another base station or another UE). In some aspects, the UE 120 may receive the configuration information via RRC signaling and/or medium access control (MAC) signaling (e.g., MAC control elements (MAC-CEs)). In some aspects, the configuration information may include an indication of one or more configuration parameters (e.g., already known to the UE 120 or hardcoded on the UE 120) for selection by the UE 120 and/or explicit configuration information for the UE 120 to use to configure itself.

In some aspects, the configuration information may indicate that the UE 120 is to receive and/or measure TRSs (e.g., for RRM measurements, tracking loop updates, AGC operations, and/or other operations). For example, the configuration information may indicate configurations of a set of TRS resources and/or a set of TRS resource sets. For example, the configuration for a TRS resource and/or a TRS resource set may be based at least in part on a CSI-RS resource configuration (e.g., a non-zero power (NZP) CSI-RS resource set). In some other aspects, the configuration for a TRS resource and/or a TRS resource set may be explicitly defined by the base station 110 (e.g., and may be independent of another resource configuration). For example, a configuration for a TRS resource and/or a TRS resource set may indicate a time domain resource allocation, a frequency domain resource allocation, an MCS, a periodicity (e.g., if the resource is a periodic or semi-persistent resource), and/or other configuration parameters (e.g., as defined, or otherwise fixed, by a wireless communication standard, such as the 3GPP).

In some aspects, the base station 110 may transmit the configuration for the set of TRS resources and/or the set of TRS resource sets via a system information message. For example, the base station 110 may transmit the configuration for a TRS resource and/or a TRS resource set via an SIB. This may enable UEs that are not operating in a connected mode (e.g., an RRC connected mode) to receive the set of TRS resources and/or the set of TRS resource sets. For example, if the base station 110 were to transmit the configuration for set of TRS resources and/or the set of TRS resource sets via an RRC configuration, then only UEs operating in an RRC connected mode may receive the configuration for set of TRS resources and/or the set of TRS resource sets. In this way, UEs operating in an idle mode (e.g., an RRC idle mode) or an inactive mode (e.g., an RRC inactive mode) may be enabled to receive and utilize TRSs transmitted by the base station for different operations, as described herein.

In some aspects, the configuration information may indicate that the base station 110 is to transmit a TRS availability indication. The TRS availability indication may indicate which TRS resources or TRS resource sets (e.g., from the configured set of TRS resources and/or set of TRS resource sets) are to be transmitted by the base station 110. For example, the base station 110 may dynamically determine whether to transmit a TRS using configured TRS resources of configured TRS resource sets. Therefore, rather than reconfiguring the configurations (e.g., rather than updating the SIB), the base station 110 may transmit the TRS availability indication to enable UEs within the wireless network to identify which TRS resources or TRS resource sets (e.g., from the configured set of TRS resources and/or set of TRS resource sets) are to be transmitted by the base station 110. In some aspects, the TRS availability indication may be transmitted by the base station 110 via Layer 1 signaling. For example, the base station 110 may transmit the TRS availability indication via a paging signal. In some aspects, the base station 110 may transmit the TRS availability indication via a PDCCH paging signal and/or a PEI signal, among other examples.

In some aspects, the configuration information may indicate that the base station 110 is to transmit a TRS availability indication that does not include a separate indication for each configured TRS resource and/or for each configured TRS resource set (e.g., an enhanced TRS availability indication). For example, the configuration information may indicate that the base station 110 is to transmit a TRS availability indication that uses groups, staggered indications, and/or partial indications, as described in more detail elsewhere herein. For example, an indication of one or more groups of TRS resource sets may be included in the configuration of the set of TRS resource sets (e.g., a group identifier may be assigned to a configuration of each TRS resource set or TRS resource). This may enable the base station 110 to transmit indications for a larger quantity of TRS resources and/or TRS resource sets. For example, using a TRS availability indication that does not include a separate indication for each configured TRS resource and/or for each configured TRS resource set may conserve resources (e.g., may reduce a size of the TRS availability indication).

The UE 120 may configure the UE 120 for communicating with the base station 110. In some aspects, the UE 120 may configure the UE 120 based at least in part on the configuration information. For example, the UE 120 may store the configuration for the set of TRS resources and/or the set of TRS resource sets. In some aspects, the UE 120 may be configured to perform one or more operations described herein.

In some aspects, the UE 120 may transmit, and the base station 110 may receive, an indication of a capability of the UE 120 to communicate (e.g., one or more of uplink transmissions or downlink transmissions) using the TRS availability indication described herein. For example, the UE 120 may indicate a capability of the UE 120 to communicate using TRS availability indications. In some aspects, the UE 120 may indicate a capability of the UE 120 to communicate using a TRS availability indication that does not include a separate indication for each configured TRS resource and/or for each configured TRS resource set (e.g., an enhanced TRS availability indication), as described in more detail elsewhere herein. In some aspects, the UE 120 may transmit the indication via RRC signaling, one or more MAC-CEs, and/or a PUCCH message, among other examples.

As shown by reference number 510, the base station 110 may transmit, and the UE 120 may receive, a TRS availability indication. In some aspects, the TRS availability indication may be associated with one or more groups of TRS resources and/or one or more groups of TRS resource sets. In some aspects, the TRS availability indication may be a staggered TRS availability indication. For example, a first signal transmitted by the base station 110 (e.g., at a first time) may indicate an availability of a first subset of TRS resources (e.g., from the set of configured TRS resources), a first subset of TRS resource sets (e.g., from the set of configured TRS resource sets), a first group of TRS resources, and/or a first group of TRS resource sets. A second signal transmitted by the base station 110 (e.g., at a second time) may indicate an availability of a second subset of TRS resources (e.g., from the set of configured TRS resources), a second subset of TRS resource sets (e.g., from the set of configured TRS resource sets), a second group of TRS resources, and/or a second group of TRS resource sets. In some aspects, the TRS availability indication may be a partial indication. For example, the TRS availability indication may include indications associated with a subset of TRS resources (e.g., from the set of configured TRS resources) and/or a subset of TRS resource sets (e.g., from the set of configured TRS resource sets). If the TRS availability indication is a partial indication, then the TRS availability indication may not include indications associated with the remaining TRS resources (e.g., from the set of configured TRS resources) and/or the remaining TRS resource sets (e.g., from the set of configured TRS resource sets).

In some aspects, the network (e.g., the base station 110) may configure the one or more groups of TRS resources and/or the one or more groups of TRS resource sets. For example, the base station 110 may transmit, and the UE 120 may receive, an indication of the one or more groups of TRS resources and/or the one or more groups of TRS resource sets. In some aspects, the indication of the one or more groups of TRS resources and/or the one or more groups of TRS resource sets may be included in the configuration of the set of TRS resources and/or the set of TRS resource sets (e.g., may be included in the SIB that configures the set of TRS resources and/or the set of TRS resource sets). For example, the configuration of the one or more groups of TRS resources and/or the one or more groups of TRS resource sets may be broadcast in a SIB (e.g., the SIB that configures the set of TRS resources and/or the set of TRS resource sets). In some other aspects, the indication of the one or more groups of TRS resources and/or the one or more groups of TRS resource sets may be included in another message, such as a Layer 1 message or a dynamic message.

In some aspects, a configuration may indicate, for a TRS resource or a TRS resource set, an identifier of a group associated with the TRS resource or the TRS resource set. For example, the one or more groups may be based at least in part on a group index assigned to the configuration of each TRS resource set or TRS resource. For example, the configuration, of a TRS resource or a TRS resource set, may include a group index in a field of the configuration. The index may map to a group that the TRS resource or the TRS resource set is included in for TRS availability indications, as described in more detail elsewhere herein.

In some aspects, the base station 110 may transmit, and the UE 120 may receive, one or more group configurations associated with the one or more groups of TRS resources and/or the one or more groups of TRS resource sets. In some aspects, a group configuration, of the one or more group configurations, indicates identifiers of one or more TRS resources and/or one or more TRS resource sets included in a group associated with the group configuration. For example, the one or more groups may be based at least in part on group configurations, where each group configuration indicates a list of identifiers of configured TRS resource sets and/or configured TRS resources. The indication of the one or more group configurations may be included in a SIB (e.g., the SIB that configures the set of TRS resources and/or the set of TRS resource sets).

In some aspects, a quantity (e.g., T) of TRS resources and/or TRS resource sets to be included in each group, of the one or more groups of TRS resources or the one or more groups of TRS resource sets, may be defined (e.g., by the base station 110 or a wireless communication standard). In such examples, a group, of the one or more groups of TRS resources and/or the one or more groups of TRS resource sets, may be formed (e.g., by the UE 120 and/or the base station 110) based at least in part on the quantity and based at least in part on identifiers of the set of TRS resources and/or identifiers of the set of TRS resource sets. For example, the identifiers of the set of TRS resources and/or identifiers of the set of TRS resource sets may be associated with an order (e.g., from a lowest identifier to a highest identifier). The UE 120 and/or the base station 110 may form a first group by include a first T TRS resources and/or T TRS resource sets (e.g., starting at the lowest identifier or the higher identifier). The UE 120 and/or the base station 110 may form a second group by including a next T TRS resources and/or a next T TRS resource sets in accordance with the order. The UE 120 and/or the base station 110 may form a third group by including a next T TRS resources and/or a next T TRS resource sets in accordance with the order. The UE 120 and the base station 110 may continue to form groups in this manner (e.g., including T TRS resources and/or T TRS resource sets in each group) until all configured TRS resources and/or all configured TRS resource sets are assigned to a group.

For example, a first group may include a first subset of TRS resources or a first subset of TRS resource sets, from the set of TRS resources or the set of TRS resource sets, and a second group may include a second subset of TRS resources or a second subset TRS resource sets from the set of TRS resources or the set of TRS resource sets. The first group and the second group both include the quantity (e.g., T) of the TRS resources or the TRS resource sets. TRS resources or TRS resource sets included in the first group and the second group may be based at least in part on the order of the identifiers of the set of TRS resources or the order of the identifiers of the set of TRS resource sets.

In some aspects, the groups may be configured by the base station 110, as described in more detail elsewhere herein. In some other aspects, the groups may be formed based at least in part on one or more rules defined, or otherwise fixed by a wireless communication standard, such as the 3GPP. For example, the one or more rules may indicate how a group (e.g., associated with the TRS availability indication) is to be formed. The base station 110 and the UE 120 may form the one or more group in accordance with the one or more rules (e.g., without a configuration or indication of the one or more groups being explicitly signaled by the base station 110).

The groups associated with the TRS availability indication may include TRS resources and/or TRS resource sets that are associated with different QCL references and/or different SSB beams (e.g., different SSB indices). For example, groups associated with the TRS availability indication may be contrasted from TRS resource sets in that TRS resources included in a TRS resource set may all be associated with the same QCL reference and/or the same SSB beam. A group associated with the TRS availability indication may be formed to include TRS resources and/or TRS resource sets that are associated with different QCL references and/or different SSB beams.

In some aspects, the TRS availability indication may include an indication for each group of the one or more groups of TRS resources or the one or more groups of TRS resource sets. An indication, for a group, may indicate whether all TRS resources or all TRS resource sets included in the group are to be transmitted by the base station 110 (e.g., one indication or one bit that applies to all TRS resources or TRS resource sets included in the group). For example, the network (e.g., the base station 110) may group TRS resource sets and/or TRS resources and simultaneously indicate whether all the TRS resources or TRS resource sets within the group are transmitted or not. For example, the TRS availability indication may include one indication (e.g., one bit) for each group in the Layer 1 TRS availability indication signaling. In this way, the base station 110 may be enabled to signal an availability for a larger quantity of TRS resources and/or TRS resource sets without increasing a size of the Layer 1 TRS availability indication signaling.

In some aspects, a quantity of groups formed for the TRS availability indication may be based at least in part on a quantity of bits available (e.g., in the Layer 1 signaling) for the TRS availability indication. For example, if 6 bits are available in a PDCCH paging signal that carries the TRS availability indication, then 6 groups may be formed (e.g., in a similar manner as described above) for the TRS availability indication. For example, if 8 TRS resource sets (e.g., associated with index values from 0 to 7) are configured (e.g., associated with 8 SSBs), then the one or more groups may include 6 groups. The 6 groups may be formed as {0, 1}, {2, 3}, {4}, {5}, {6}, and {7} (e.g., with each number indicating an index value of a TRS resource or TRS resource set). For example, the groups associated with the TRS availability indication may include different quantities of TRS resource and/or TRS resource sets (e.g., in the example described above, the first 2 groups include 2 TRS resource sets and the remaining groups each include 1 TRS resource set). As another example, if 24 TRS resource sets (e.g., associated with index values from 0 to 23) are configured (e.g., associated with 24 SSBs), then the one or more groups may be formed into 4 groups as {0 to 5}, {6 to 11}, {12 to 17}, and {18 to 23} (e.g., with each group including 6 TRS resource sets). As another example, the 24 TRS resource sets may be formed into 6 groups, such as {0 to 3}, {4 to 7}, {8 to 11}, {12 to 15}, {16 to 19}, and {20 to 23}. As another example, if 28 TRS resource sets (e.g., associated with index values from 0 to 27) are configured (e.g., associated with 28 SSBs), then the one or more groups may be formed into then 28 TRS resource sets may be formed into 6 groups, such as {0 to 4}, {5 to 9}, {10 to 14}, {15 to 19}, {20 to 24}, and {25 to 27}.

As described in more detail elsewhere herein, the TRS availability indication may include separate indications for each group. For example, each group may be associated with a bit in a bitmap of the L1 TRS availability indication signaling (e.g., a single bit per group in the L1 TRS availability indication signaling). For example, if 6 groups are formed, then the TRS availability indication may include 6 indications (e.g., 6 bits). For example, 1 bit may be used to indicate an availability of a group, where a value of "0" indicates that the group is unavailable (e.g., not transmitted by the base station 110) and a value of "1" indicates that the group is available (e.g., transmitted by the base station 110). For example, referring to the example described above where 28 TRS resource sets (or TRS resources) are formed into 6 groups of {0 to 4}, {5 to 9}, {10 to 14}, {15 to 19}, {20 to 24}, and {25 to 27}, a first bit of the TRS availability indication may indicate a value of "0," thereby indicating that TRS resources or TRS resource sets associated with index values from 0 to 4 are unavailable (e.g., not transmitted by the base station 110). A second bit of the TRS availability indication may indicate a value of "1," thereby indicating that TRS resources or TRS resource sets associated with index values from 5 to 9 are available (e.g., are transmitted by the base station 110). The TRS availability indication may include 6 bits (e.g., in a bitmap) indicating the availability of each group in a similar manner as described above. As a result, 6 bits (e.g., rather than 28 bits) may be used by the base station 110 to indicate the availability of the 28 TRS resource sets (or TRS resources).

In some aspects, the TRS availability indication may be associated with staggered indications. "Staggered indications" may refer to different signals, that are transmitted at different times, being associated with availability indications for different TRS resources or different TRS resource sets. For example, the TRS availability indication may be associated with multiple signals. Each signal, of the multiple signals, may indicate an availability associated with a group of the one or more groups of TRS resources or the one or more groups of TRS resource sets. In other words, the base station 110 may transmit, and the UE 120 may receive, a first availability indication associated with a first group of the one or more groups of TRS resources or the one or more groups of TRS resource sets. The base station 110 may transmit, and the UE 120 may receive, a second availability indication associated with a second group of the one or more groups of TRS resources or the one or more groups of TRS resource sets. The first availability indication may be transmitted and/or received using a first set of time-frequency resources, and wherein the second availability indication may be transmitted and/or received using a second set of time-frequency resources. The first availability indication may indicate whether TRS resources or TRS resource sets, included in the first group, are to be transmitted by the base station 110. The second availability indication may indicate whether TRS resources or TRS resource sets, included in the second group, are to be transmitted by the base station 110.

In some aspects, the first availability indication includes separate indications for each TRS resource or TRS resource set included in the first group. Similarly, the second availability indication may include separate indications for each TRS resource or TRS resource set included in the second group. In other words, one bit in the indication may be mapped to one TRS resource set or to one TRS resource. For example, rather than a single bit or a single indication applying to all TRS resources or all TRS resource sets in the group, the base station 110 may use staggered indications to enable each signal to include separate indications for each TRS resource or TRS resource set included in a group. For example, because each signal is associated with less than the total quantity of configured TRS resources or TRS resources sets (e.g., each signal is associated with one (or more) groups), the base station 110 may be enabled to indicate an availability of a larger quantity of TRS resources or TRS resource sets without increasing a size of each individual signal.

Groups associated with the staggered indications may be formed in a similar (or the same) manner as described in more detail elsewhere herein. In some aspects, a group associated with the staggered indications may include one or more groups of TRS resources and/or groups of TRS resource sets (e.g., that are formed in a similar (or the same) manner as described in more detail elsewhere herein). For example, a group associated with the staggered indications may include a first group of TRS resource sets, a second group of TRS resource sets, a third group of TRS resource sets, and so on. Each indication (e.g., each bit) included in the availability indication may map to, or be associated with, a group of TRS resource sets or a group of TRS resources.

In some aspects, a pattern or timing of the staggered indications may be based at least in part on a paging cycle associated with the UE 120. In some aspects, the paging cycle may be, or may be based at least in part on, a discontinuous reception (DRX) cycle associated with the UE 120. For example, the UE 120 may monitor one or more paging occasions during each paging cycle. A paging occasion may be a set of PDCCH monitoring occasions and may consist of multiple time slots (e.g. subframes or OFDM symbols) during which a paging signal may be transmitted (e.g., by the base station 110). For example, the first availability indication (e.g., described in the example above) may be transmitted and/or received during a first paging cycle and the second availability indication may be transmitted and/or received during a second paging cycle.

In some aspects, the base station 110 may use a transmission pattern and/or repetitions associated with the staggered indications. As used herein, "repetition" may refer to a communication that is transmitted more than one time, and includes the initial transmission of that communication as well as each subsequent transmission of that communication. For example, each repetition may be identical copies of one another. In some aspects, the base station 110 may transmit one or more repetitions of an availability indication (e.g., associated with a group) during a paging cycle. In some aspects, the base station 110 may transmit multiple availability indications (e.g., associated with different groups) during the same paging cycle. For example, the base station 110 may transmit a first availability indication (e.g., associated with a first group) and a second availability indication (e.g., associated with a second group) during the same paging cycle. In some aspects, the transmission pattern and/or repetitions associated with the staggered indications may be configured by the base station 110. Additionally, or alternatively, the transmission pattern and/or repetitions associated with the staggered indications may be defined, or otherwise fixed, by a wireless communication standard, such as the 3GPP. Examples of transmission patterns and/or repetitions associated with the staggered indications are depicted and described in more detail in connection with FIG. 6.

In some aspects, each TRS availability indication (e.g., each signal) associated with the staggered indications may be associated with a validity duration. "Validity duration" may refer to an amount of time for which the information included in the TRS availability indication is valid or can be applied by the UE 120. The validity duration may also be referred to as a validity window. In some aspects, the staggered indications may each be associated with the same validity duration. For example, a first availability indication (e.g., associated with a first group) and a second availability indication (e.g., associated with a second group) may associated with the same validity duration. "Same validity duration" may refer to a validity duration that has a common start point and a common end point (e.g., in time) for each indication associated with the staggered indications (e.g., a common start point and a common end point for both the first availability indication and the second availability indication). In other words, a common start and end of the validity duration may be defined for all L1 availability indications associated with staggered indications. In some aspects, the common start point and common end point may be defined based at least in part on the paging cycle associated with the UE 120. For example, the validity duration may be defined from a start of a paging cycle to an end of the paging cycle. In some aspects, the validity duration may be defined based at least in part on a quantity of paging cycles. For example, the validity duration may indicate that the staggered indications are valid for a next L paging cycles, where L is a quantity of paging cycles.

In some aspects, the staggered indications may be associated with different validity durations. For example, an amount of time associated with each validity durations may be the same, but a start point and/or end point for the validity durations may be different. For example, a first availability indication may be associated with a first validity duration (e.g., a first start point and a first end point for the first validity duration) and a second availability indication is associated with a second validity duration (e.g., a second start point and a second end point for the second validity duration). The first validity duration and the second validity duration may be associated with the same amount of time, but different start points and different end points. For example, the start point and/or end point of a validity duration may be based at least in part on a time when the availability indication associated with the validity duration is received. For example, the first validity duration may be based at least in part on a first time at which the first availability indication is received. The second validity duration may be based at least in part on a second time at which the second availability indication is received. In other words, a location (e.g., in the time domain) where each L1 availability indication is received may be used as a reference time for the start of the validity duration. In some aspects, a delay offset may be applied from the time at which the indication is received to the start point of the validity duration (e.g., the validity duration for an availability indication may start Z milliseconds or Z symbols after the availability indication is received, where Z is the delay offset). For example, the delay offset may be associated with an amount of time for the UE 120 to decode the availability indication.

In some aspects, the TRS availability indication transmitted by the base station 110 may be a partial indication. As used herein, "partial indication" may refer to a TRS availability indication that is associated with a subset of TRS resources, from the set of configured TRS resources, or a subset of TRS resource sets from the set of configured TRS resource sets. For example, if a partial indication is used by the base station 110, then the base station 110 may not indicate an availability of one or more configured TRS resources and/or configured TRS resource sets (e.g., in any TRS availability indication). For example, a partial indication may indicate whether the subset of TRS resources or the subset of TRS resource sets from the set of TRS resource sets are to be transmitted by the base station 110.

For the remaining TRS resources and/or the remaining TRS resource sets, the UE 120 may assume whether the remaining TRS resources and/or the remaining TRS resource sets are to be transmitted by the base station 110. "Remaining TRS resources" may refer to TRS resources, from the set of configured TRS resources, that are not indicated by the partial TRS availability indication. For example, remaining TRS resources may refer to TRS resources, from the set of configured TRS resources, that are not included in the subset of TRS resources associated with the partial indication. Similarly, "remaining TRS resource sets" may refer to TRS resource sets, from the set of configured TRS resource sets, that are not indicated by the partial TRS availability indication. For example, the remaining TRS resource sets may refer to TRS resource sets, from the set of configured TRS resource sets, that are not included in the subset of TRS resource sets associated with the partial indication.

In some aspects, the UE 120 may identify that remaining TRS resources and/or remaining TRS resource sets are to be transmitted by the base station 110. For example, a rule may be defined (e.g., by the base station 110 and/or a wireless communication standard) that indicates that remaining TRS resources and/or remaining TRS resource sets are always available (e.g., always transmitted by the base station 110 without any further Layer 1 signaling). Alternatively, the rule may indicate that remaining TRS resources and/or remaining TRS resource sets are always unavailable (e.g., always not transmitted by the base station 110).

In some aspects, the base station 110 may transmit, and the UE 120 may receive, an indication of whether the UE 120 is to identify that the base station 110 is to transmit or not transmit remaining TRS resources or remaining TRS resource sets, from the set of TRS resources or the set of TRS resource sets, that are not included in the availability indication. For example, the base station 110 may indicate (e.g., in a SIB) whether the UE is to assume that remaining TRS resources and/or remaining TRS resource sets (e.g., that are not indicated by the TRS availability indication) are available or unavailable. For example, a single bit in a SIB may indicate that the UE 120 is to assume that remaining TRS resources and/or remaining TRS resource sets are available or unavailable.

In some aspects, the TRS availability indication may use a combination of groups, staggered indications, and/or partial indications, as described in more detail elsewhere herein. For example, the TRS availability indication may be associated with one or more groups of TRS resources and/or one or more groups of TRS resource sets and may be associated with a partial indication. As another example, the TRS availability indication may be associated with one or more groups of TRS resources and/or one or more groups of TRS resource sets and may be associated with staggered indications. As another example, the TRS availability indication may be associated with staggered indications and may be associated with a partial indication. By transmitting a TRS availability indication as described in more detail elsewhere herein, the base station 110 may be enabled to transmit a TRS availability indication that is associated with a smaller quantity of bits than the quantity of configured TRS resources and/or quantity of configured TRS resource sets.

As shown by reference number 515, the UE 120 may determine or identify available TRS resources and/or available TRS resource sets based at least in part on receiving the TRS availability indication. For example, the UE 120 may identify one or more TRS resources and/or one or more TRS resource sets that are to be used by the base station 110 to transmit a TRS. In some aspects, the UE 120 may monitor the one or more TRS resources and/or one or more TRS resource sets that are to be used by the base station 110 to transmit a TRS (e.g., to enable the UE 120 to receive the TRS). The UE 120 may refrain from monitoring unavailable TRS resources and/or unavailable TRS resource sets (e.g., as indicated by the TRS availability indication). For example, the UE 120 may identify one or more TRS resources and/or one or more TRS resource sets (e.g., from the configuration indicated by a SIB) that are not to be used by the base station 110 to transmit a TRS. The UE 120 may refrain from monitoring the one or more TRS resources and/or one or more TRS resource sets that are not to be used by the base station 110 to transmit a TRS. This may conserve resources (e.g., power resources, processing resources, and/or other resources) of the UE 120 that would have otherwise been used to monitor TRS resources and/or TRS resource sets (e.g., from the configured TRS resources and/or the configured TRS resource sets) that are not used by the base station 110.

As shown by reference number 520, the base station 110 may transmit, and the UE 120 may receive, a TRS using a TRS resource, from the set of TRS resources, or a TRS resource set from the set of TRS resource sets, based at least in part on the TRS availability indication. For example, the base station 110 may transmit, and the UE 120 may receive, the TRS using a TRS resource and/or a TRS resource set that is indicated as available by the TRS availability indication.

As a result, the base station 110 may be enabled to transmit, and a UE 120 may be enabled to receive, a TRS availability indication for the set of configured TRS resources or the set of configured TRS resource sets in a signal that is associated with a limited or restricted available size for the TRS availability indication. In other words, the base station 110 may be enabled to use a TRS availability indication that is associated with a smaller quantity of bits than a quantity of configured TRS resources and/or a quantity of configured TRS resource sets.

As indicated above, FIG. 5 is provided as an example. Other examples may differ from what is described with respect to FIG. 5.

Figure 6:
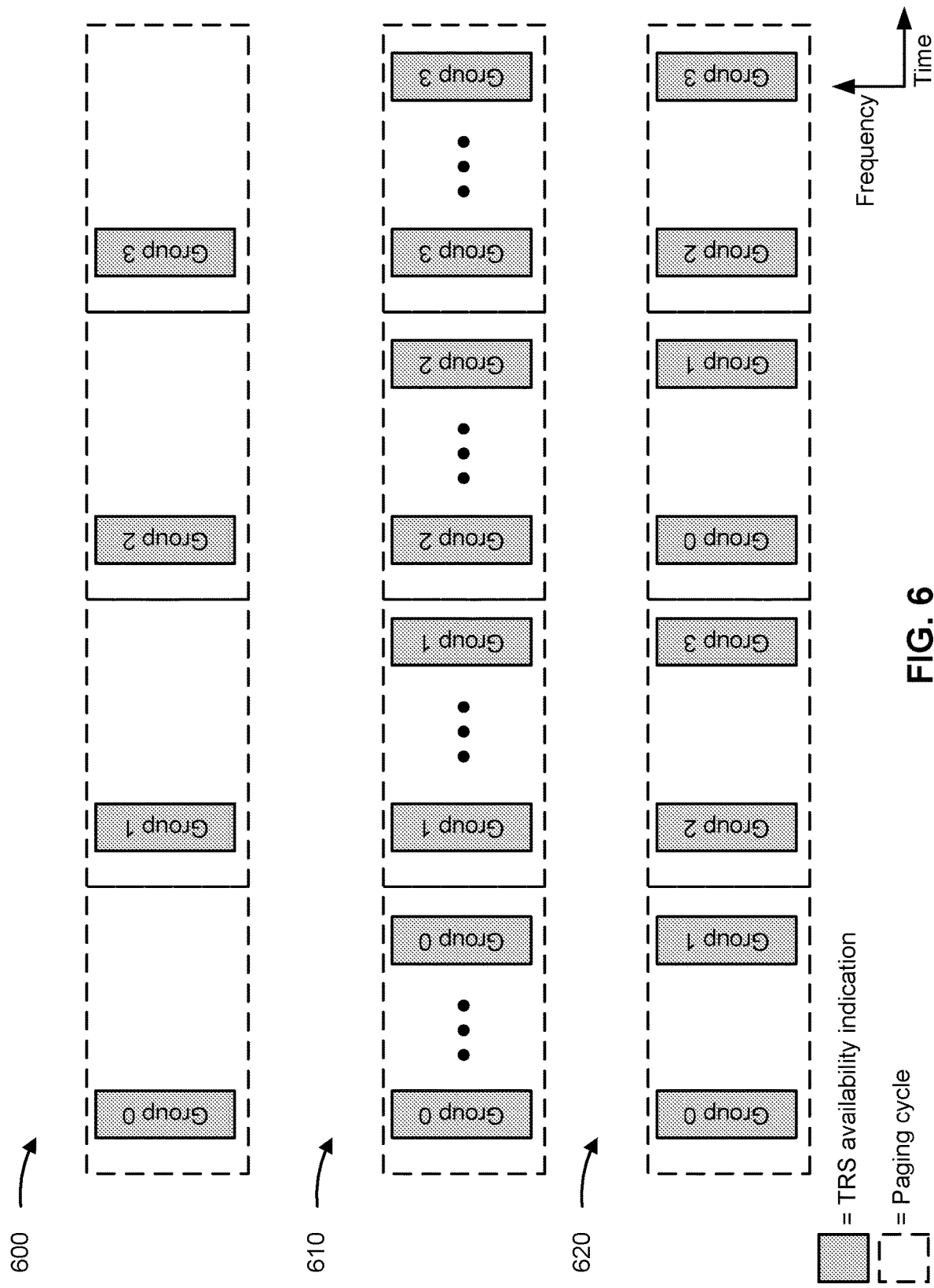
FIG. 6 is a diagram illustrating examples associated with staggered TRS availability indications, in accordance with the present disclosure.

FIG. 6 is a diagram illustrating examples 600, 610, and 620 associated with staggered TRS availability indications, in accordance with the present disclosure. As shown in FIG. 6, a base station (e.g., a base station 110) may transmit, to a UE (e.g., a UE 120) one or more TRS availability indications, as described in more detail elsewhere herein, such as in connection with FIG. 5. The examples 600, 610, and 620 depict examples of staggered indications associated with a TRS availability indication (e.g., as described in more detail in connection with FIG. 5).

As described in more detail elsewhere herein, the staggered indications may be associated with groups of TRS resources and/or groups of TRS resource sets. Examples 600, 610, and 620 depict examples in which 4 groups (e.g., group 0, group 1, group 2, and group 3) are formed for the staggered indications. In other examples, a different quantity of groups may be formed and the staggered indications may be transmitted in a similar manner as described herein. The staggered indications may be associated with, or may be based at least in part on, a paging cycle (e.g., a DRX cycle) associated with the UE.

Example 600 depicts an example in which the base station transmits a TRS availability indication associated with a different group during each paging cycle. For example, as shown in FIG. 6, during a first paging cycle, the base station may transmit, and the UE may receive, a first TRS availability indication associated with the group 0. During a second paging cycle, the base station may transmit, and the UE may receive, a second TRS availability indication associated with the group 1. During a third paging cycle, the base station may transmit, and the UE may receive, a third TRS availability indication associated with the group 2. During a fourth paging cycle, the base station may transmit, and the UE may receive, a fourth TRS availability indication associated with the group 3. After the fourth paging cycle (e.g., in a fifth paging cycle not shown in FIG. 6), the base station may transmit, and the UE may receive, another TRS availability indication associated with the group 0. The base station may continue to transmit staggered TRS availability indications following the pattern described above. As shown in FIG. 6, and example 600, the base station may transmit a single indication (e.g., a single Layer 1 indication) during each paging cycle.

Example 610 depicts an example in which the base station transmits one or more repetitions of a TRS availability indication associated with a different group during each paging cycle. In other words, the base station may transmit multiple repetitions (e.g., multiple Layer 1 indications) associated with the same group during a paging cycle. For example, as shown in FIG. 6, during a first paging cycle, the base station may transmit, and the UE may receive, one or more repetitions of a first TRS availability indication associated with the group 0. During a second paging cycle, the base station may transmit, and the UE may receive, one or more repetitions of a second TRS availability indication associated with the group 1. During a third paging cycle, the base station may transmit, and the UE may receive, one or more repetitions of a third TRS availability indication associated with the group 2. During a fourth paging cycle, the base station may transmit, and the UE may receive, one or more repetitions of a fourth TRS availability indication associated with the group 3. After the fourth paging cycle (e.g., in a fifth paging cycle not shown in FIG. 6), the base station may transmit, and the UE may receive, another one or more repetitions of a TRS availability indication associated with the group 0. The base station may continue to transmit staggered TRS availability indications with repetitions following the pattern described above. The quantity of repetitions transmitted during each paging cycle may be configured by the base station and/or may be defined by a wireless communication standard, such as the 3GPP. In some aspects, the quantity of repetitions transmitted during each paging cycle may vary over time (e.g., the base station may transmit a first quantity of repetitions during a first paging cycle and may transmit a second quantity of repetitions during a second paging cycle).

Example 620 depicts an example in which the base station transmits multiple TRS availability indications associated with different groups during the same paging cycle. Example 620 depicts 2 TRS availability indications transmitted during each paging cycle. However, a different quantity of TRS availability indications may be transmitted during each paging cycle. As shown in FIG. 6, and example 620, during a first paging cycle, the base station may transmit, and the UE may receive, a first TRS availability indication associated with the group 0 and a second TRS availability indication associated with the group 1. During a second paging cycle, the base station may transmit, and the UE may receive, a third TRS availability indication associated with the group 2 and a fourth TRS availability indication associated with the group 3. During a third paging cycle, the base station may transmit, and the UE may receive, a fifth TRS availability indication associated with the group 0 and a sixth TRS availability indication associated with the group 1. The fifth TRS availability indication and the first TRS availability indication may be associated with the same group (e.g., of TRS resources and/or TRS resource sets) and may indicate the same or different availability for the group 0. Similarly, the sixth TRS availability indication and the second TRS availability indication may be associated with the same group (e.g., of TRS resources and/or TRS resource sets) and may indicate the same or different availability for the group 1. During a fourth paging cycle, the base station may transmit, and the UE may receive, a seventh TRS availability indication associated with the group 2 and an eighth TRS availability indication associated with the group 3. As described above, the seventh TRS availability indication and the third TRS availability indication may both be associated with the group 2 and may indicate the same or a different availability for the group 2. Similarly, the eighth TRS availability indication and the fourth TRS availability indication may both be associated with the group 3 and may indicate the same or a different availability for the group 3. The base station may continue to transmit staggered TRS availability indications, with multiple indications associated with different groups transmitted during the same paging cycle, following the pattern described above.

In some aspects, a combination of techniques or operations described in connection with example 600, example 610, and/or example 620 may be used by the base station to transmit staggered TRS availability indications. For example, the base station may transmit one or more repetitions of a first TRS availability indication (e.g., associated with a first group) and one or more repetitions of a second TRS availability indication (e.g., associated with a second group) during the same paging cycle.

As indicated above, FIG. 6 is provided as an example. Other examples may differ from what is described with respect to FIG. 6.

Figure 7:
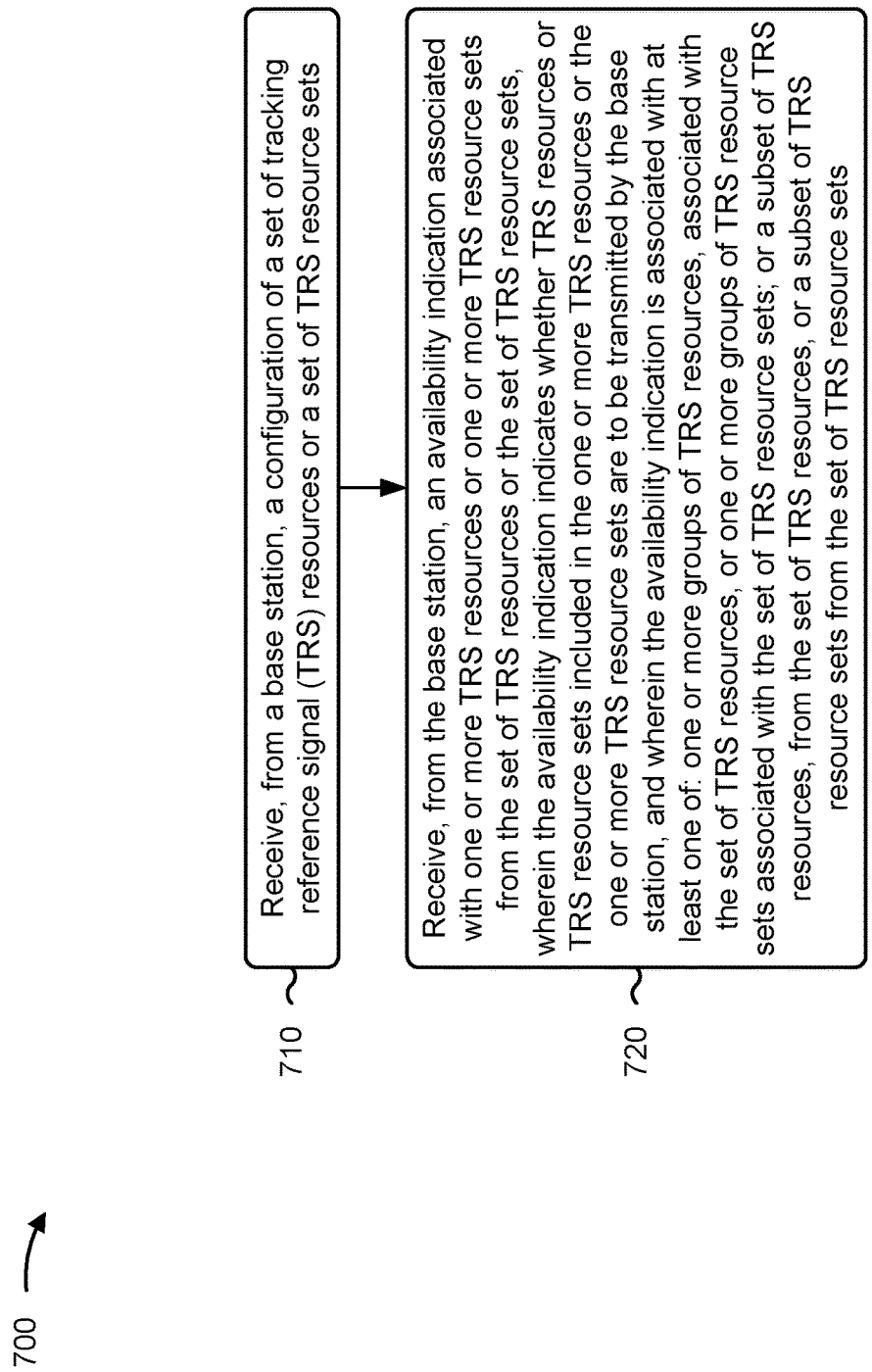
FIGS. 7 and 8 are diagrams illustrating example processes associated with TRS availability indications, in accordance with the present disclosure.

FIG. 7 is a diagram illustrating an example process 700 performed, for example, by a UE, in accordance with the present disclosure. Example process 700 is an example where the UE (e.g., UE 120) performs operations associated with TRS availability indication.

As shown in FIG. 7, in some aspects, process 700 may include receiving, from a base station, configurations of a set of TRS resources or a set of TRS resource sets (block 710). For example, the UE (e.g., using communication manager 140 and/or reception component 902, depicted in FIG. 9)

may receive configurations of a set of TRS resources or a set of TRS resource sets, as described above.

As further shown in FIG. 7, in some aspects, process 700 may include receiving, from the base station, an availability indication associated with one or more TRS resources or one or more TRS resource sets from the set of TRS resources or the set of TRS resource sets, wherein the availability indication indicates whether TRS resources or TRS resource sets included in the one or more TRS resources or the one or more TRS resource sets are to be transmitted by the base station, and wherein the availability indication is associated with at least one of: one or more groups of TRS resources, associated with the set of TRS resources, or one or more groups of TRS resource sets associated with the set of TRS resource sets; or a subset of TRS resources, from the set of TRS resources, or a subset of TRS resource sets from the set of TRS resource sets (block 720). For example, the UE (e.g., using communication manager 140 and/or reception component 902, depicted in FIG. 9) may receive, from the base station, an availability indication associated with one or more TRS resources or one or more TRS resource sets from the set of TRS resources or the set of TRS resource sets, wherein the availability indication indicates whether TRS resources or TRS resource sets included in the one or more TRS resources or the one or more TRS resource sets are to be transmitted by the base station, and wherein the availability indication is associated with at least one of: one or more groups of TRS resources, associated with the set of TRS resources, or one or more groups of TRS resource sets associated with the set of TRS resource sets; or a subset of TRS resources, from the set of TRS resources, or a subset of TRS resource sets from the set of TRS resource sets, as described above.

Process 700 may include additional aspects, such as any single aspect or any combination of aspects described below and/or in connection with one or more other processes described elsewhere herein.

In a first aspect, the availability indication is received via Layer 1 signaling.

In a second aspect, alone or in combination with the first aspect, the availability indication is associated with a paging signal.

In a third aspect, alone or in combination with one or more of the first and second aspects, process 700 includes receiving, from the base station, an indication of the one or more groups of TRS resources or the one or more groups of TRS resource sets.

In a fourth aspect, alone or in combination with one or more of the first through third aspects, the indication of the one or more groups of TRS resources or the one or more groups of TRS resource sets is included in the configuration of the set of TRS resources or the set of TRS resource sets.

In a fifth aspect, alone or in combination with one or more of the first through fourth aspects, the configuration indicates, for a TRS resource or a TRS resource set, an identifier of a group associated with the TRS resource or the TRS resource set.

In a sixth aspect, alone or in combination with one or more of the first through fifth aspects, process 700 includes receiving, from the base station, one or more group configurations associated with the one or more groups of TRS resources or the one or more groups of TRS resource sets, wherein a group configuration, of the one or more group configurations, indicates identifiers of one or more TRS resources or one or more TRS resource sets included in a group associated with the group configuration.

In a seventh aspect, alone or in combination with one or more of the first through sixth aspects, a quantity of TRS resources or TRS resource sets to be included in each group, of the one or more groups of TRS resources or the one or more groups of TRS resource sets, is defined, and wherein a group, of the one or more groups of TRS resources or the one or more groups of TRS resource sets, is formed based at least in part on the quantity and based at least in part on identifiers of the set of TRS resources or identifiers of the set of TRS resource sets.

In an eighth aspect, alone or in combination with one or more of the first through seventh aspects, a first group includes a first subset of TRS resources or TRS resource sets, from the set of TRS resources or the set of TRS resource sets, and a second group includes a second subset of TRS resources or TRS resource sets from the set of TRS resources or the set of TRS resource sets, wherein the first group and the second group both include the quantity of the TRS resources or the TRS resource sets, and wherein TRS resources or TRS resource sets included in the first group and the second group are based at least in part on an order of the identifiers of the set of TRS resources or an order of the identifiers of the set of TRS resource sets.

In a ninth aspect, alone or in combination with one or more of the first through eighth aspects, a group, of the one or more groups of TRS resources or the one or more groups of TRS resource sets, includes TRS resources or TRS resource sets that are associated with different QCL references.

In a tenth aspect, alone or in combination with one or more of the first through ninth aspects, the availability indication includes an indication for each group of the one or more groups of TRS resources or the one or more groups of TRS resource sets, and wherein an indication, for a group, indicates whether all TRS resources or all TRS resource sets included in the group are to be transmitted by the base station.

In an eleventh aspect, alone or in combination with one or more of the first through tenth aspects, the availability indication is associated with multiple signals, and wherein each signal, of the multiple signals, indicates an availability associated with a group of the one or more groups of TRS resources or the one or more groups of TRS resource sets.

In a twelfth aspect, alone or in combination with one or more of the first through eleventh aspects, receiving the availability indication includes receiving, from the base station, a first availability indication associated with a first group of the one or more groups of TRS resources or the one or more groups of TRS resource sets, and receiving, from the base station, a second availability indication associated with a second group of the one or more groups of TRS resources or the one or more groups of TRS resource sets.

In a thirteenth aspect, alone or in combination with one or more of the first through twelfth aspects, the first availability indication is received using a first set of time-frequency resources, and wherein the second availability indication is received using a second set of time-frequency resources.

In a fourteenth aspect, alone or in combination with one or more of the first through thirteenth aspects, the first availability indication indicates whether TRS resources or TRS resource sets, included in the first group, are to be transmitted by the base station, and the second availability indication indicates whether TRS resources or TRS resource sets, included in the second group, are to be transmitted by the base station.

In a fifteenth aspect, alone or in combination with one or more of the first through fourteenth aspects, the first availability indication includes separate indications for each TRS resource or TRS resource set included in the first group, and the second availability indication includes separate indications for each TRS resource or TRS resource set included in the second group.

In a sixteenth aspect, alone or in combination with one or more of the first through fifteenth aspects, the first availability indication is received during a first paging cycle, and the second availability indication is received during a second paging cycle.

In a seventeenth aspect, alone or in combination with one or more of the first through sixteenth aspects, the first availability indication and the second availability indication are associated with a same validity duration.

In an eighteenth aspect, alone or in combination with one or more of the first through seventeenth aspects, the same validity duration is associated with a common start point and a common end point for both the first availability indication and the second availability indication.

In a nineteenth aspect, alone or in combination with one or more of the first through eighteenth aspects, the first availability indication is associated with a first validity duration and the second availability indication is associated with a second validity duration.

In a twentieth aspect, alone or in combination with one or more of the first through nineteenth aspects, the first validity duration is based at least in part on a first time at which the first availability indication is received, and wherein the second validity duration is based at least in part on a second time at which the second availability indication is received.

In a twenty-first aspect, alone or in combination with one or more of the first through twentieth aspects, the availability indication indicates whether the subset of TRS resources or the subset of TRS resource sets from the set of TRS resource sets are to be transmitted by the base station.

In a twenty-second aspect, alone or in combination with one or more of the first through twenty-first aspects, remaining TRS resources or remaining TRS resource sets are to be transmitted by the base station, and the remaining TRS resources or the remaining TRS resource sets are TRS resources or TRS resource sets, from the set of TRS resources or the set of TRS resource sets, that are not included in the subset of TRS resources or the subset of TRS resource sets.

In a twenty-third aspect, alone or in combination with one or more of the first through twenty-second aspects, remaining TRS resources or remaining TRS resource sets are not to be transmitted by the base station, and the remaining TRS resources or the remaining TRS resource sets are TRS resources or TRS resource sets, from the set of TRS resources or the set of TRS resource sets, that are not included in the subset of TRS resources or the subset of TRS resource sets.

In a twenty-fourth aspect, alone or in combination with one or more of the first through twenty-third aspects, process 700 includes receiving, from the base station, an indication of whether the UE is to identify that the base station is to transmit or not transmit remaining TRS resources or remaining TRS resource sets, from the set of TRS resources or the set of TRS resource sets, that are not included in the availability indication.

In a twenty-fifth aspect, alone or in combination with one or more of the first through twenty-fourth aspects, process 700 includes receiving, from the base station, a TRS using a TRS resource, from the set of TRS resources, or a TRS resource set from the set of TRS resource sets, based at least in part on the availability indication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
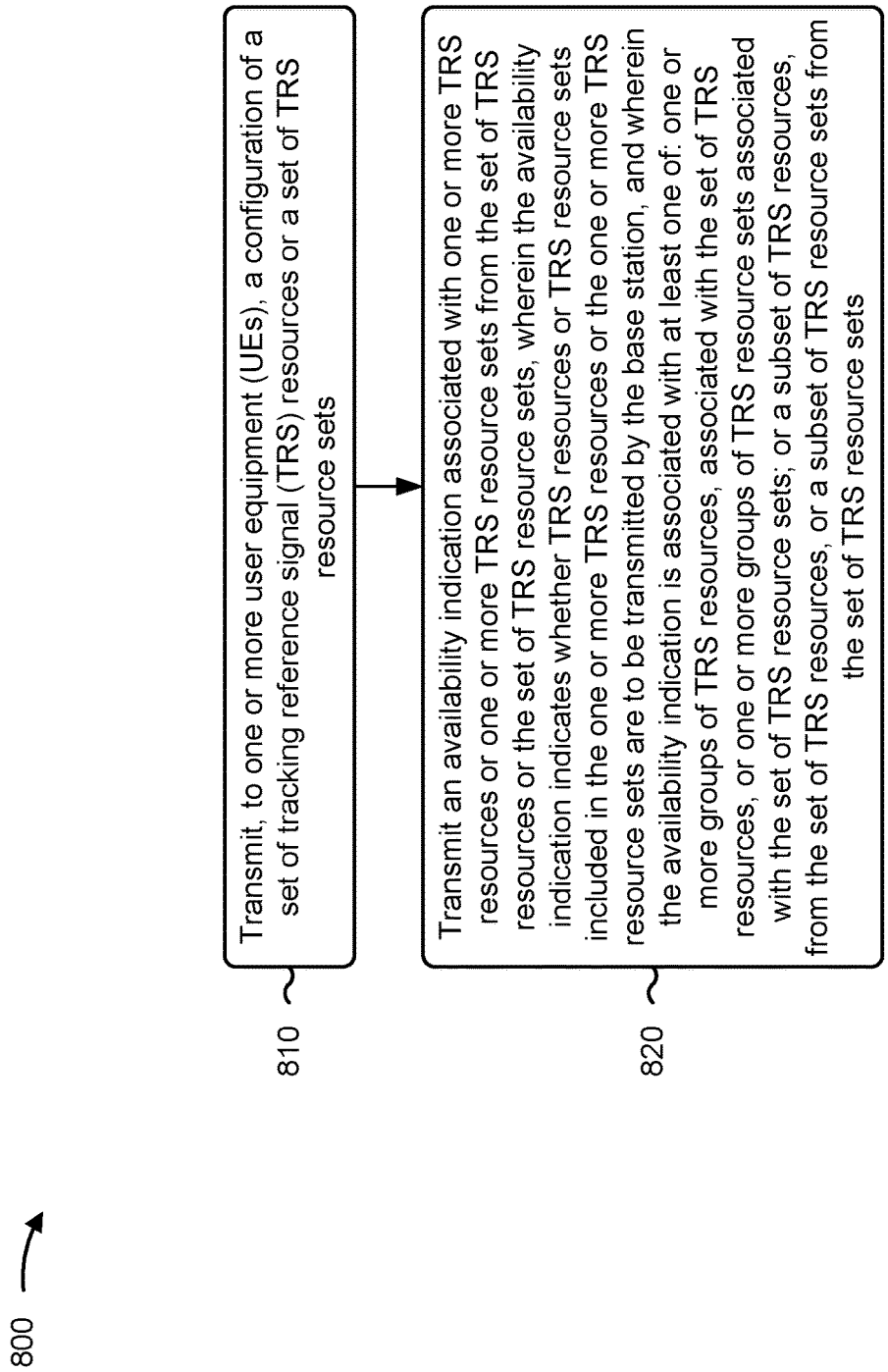

FIG. 8 is a diagram illustrating an example process 800 performed, for example, by a base station, in accordance with the present disclosure. Example process 800 is an example where the base station (e.g., base station 110) performs operations associated with TRS availability indication.

As shown in FIG. 8, in some aspects, process 800 may include transmitting, to UEs, configurations of a set of TRS resources or a set of TRS resource sets (block 810). For example, the base station (e.g., using communication manager 150 and/or transmission component 1004, depicted in FIG. 10) may transmit, to one or more UEs, configurations of a set of TRS resources or a set of TRS resource sets, as described above.

As further shown in FIG. 8, in some aspects, process 800 may include transmitting an availability indication associated with one or more TRS resources or one or more TRS resource sets from the set of TRS resources or the set of TRS resource sets, wherein the availability indication indicates whether TRS resources or TRS resource sets included in the one or more TRS resources or the one or more TRS resource sets are to be transmitted by the base station, and wherein the availability indication is associated with at least one of: one or more groups of TRS resources, associated with the set of TRS resources, or one or more groups of TRS resource sets associated with the set of TRS resource sets; or a subset of TRS resources, from the set of TRS resources, or a subset of TRS resource sets from the set of TRS resource sets (block 820). For example, the base station (e.g., using communication manager 150 and/or transmission component 1004, depicted in FIG. 10) may transmit an availability indication associated with one or more TRS resources or one or more TRS resource sets from the set of TRS resources or the set of TRS resource sets, wherein the availability indication indicates whether TRS resources or TRS resource sets included in the one or more TRS resources or the one or more TRS resource sets are to be transmitted by the base station, and wherein the availability indication is associated with at least one of: one or more groups of TRS resources, associated with the set of TRS resources, or one or more groups of TRS resource sets associated with the set of TRS resource sets; or a subset of TRS resources, from the set of TRS resources, or a subset of TRS resource sets from the set of TRS resource sets, as described above.

Process 800 may include additional aspects, such as any single aspect or any combination of aspects described below and/or in connection with one or more other processes described elsewhere herein.

In a first aspect, the availability indication is transmitted via Layer 1 signaling.

In a second aspect, alone or in combination with the first aspect, the availability indication is associated with a paging signal.

In a third aspect, alone or in combination with one or more of the first and second aspects, process 800 includes transmitting an indication of the one or more groups of TRS resources or the one or more groups of TRS resource sets.

In a fourth aspect, alone or in combination with one or more of the first through third aspects, the indication of the one or more groups of TRS resources or the one or more groups of TRS resource sets is included in the configuration of the set of TRS resources or the set of TRS resource sets.

In a fifth aspect, alone or in combination with one or more of the first through fourth aspects, the configuration indicates, for a TRS resource or a TRS resource set, an identifier of a group associated with the TRS resource or the TRS resource set.

In a sixth aspect, alone or in combination with one or more of the first through fifth aspects, process 800 includes transmitting one or more group configurations associated with the one or more groups of TRS resources or the one or more groups of TRS resource sets, wherein a group configuration, of the one or more group configurations, indicates identifiers of one or more TRS resources or one or more TRS resource sets included in a group associated with the group configuration.

In a seventh aspect, alone or in combination with one or more of the first through sixth aspects, a quantity of TRS resources or TRS resource sets to be included in each group, of the one or more groups of TRS resources or the one or more groups of TRS resource sets, is defined, and a group, of the one or more groups of TRS resources or the one or more groups of TRS resource sets, is formed based at least in part on the quantity and based at least in part on identifiers of the set of TRS resources or identifiers of the set of TRS resource sets.

In an eighth aspect, alone or in combination with one or more of the first through seventh aspects, a first group includes a first subset of TRS resources or TRS resource sets, from the set of TRS resources or the set of TRS resource sets, and a second group includes a second subset of TRS resources or TRS resource sets from the set of TRS resources or the set of TRS resource sets, the first group and the second group both include the quantity of the TRS resources or the TRS resource sets, and TRS resources or TRS resource sets included in the first group and the second group are based at least in part on an order of the identifiers of the set of TRS resources or an order of the identifiers of the set of TRS resource sets.

In a ninth aspect, alone or in combination with one or more of the first through eighth aspects, a group, of the one or more groups of TRS resource sets or the one or more groups of TRS resource sets, includes TRS resources or TRS resource sets that are associated with different QCL references.

In a tenth aspect, alone or in combination with one or more of the first through ninth aspects, the availability indication includes an indication for each group of the one or more groups of TRS resources or the one or more groups of TRS resource sets, and an indication, for a group, indicates whether all TRS resources or all TRS resource sets included in the group are to be transmitted by the base station.

In an eleventh aspect, alone or in combination with one or more of the first through tenth aspects, the availability indication is associated with multiple signals, and each signal, of the multiple signals, indicates an availability associated with a group of the one or more groups of TRS resources or the one or more groups of TRS resource sets.

In a twelfth aspect, alone or in combination with one or more of the first through eleventh aspects, transmitting the availability indication includes transmitting a first availability indication associated with a first group of the one or more groups of TRS resources or the one or more groups of TRS resource sets, and transmitting a second availability indication associated with a second group of the one or more groups of TRS resources or the one or more groups of TRS resource sets.

In a thirteenth aspect, alone or in combination with one or more of the first through twelfth aspects, the first availability indication is transmitted using a first set of time-frequency resources, and wherein the second availability indication is received using a second set of time-frequency resources.

In a fourteenth aspect, alone or in combination with one or more of the first through thirteenth aspects, the first availability indication indicates whether TRS resources or TRS resource sets, included in the first group, are to be transmitted by the base station, and the second availability indication indicates whether TRS resources or TRS resource sets, included in the second group, are to be transmitted by the base station.

In a fifteenth aspect, alone or in combination with one or more of the first through fourteenth aspects, the first availability indication includes separate indications for each TRS resource or TRS resource set included in the first group, and the second availability indication includes separate indications for each TRS resource or TRS resource set included in the second group.

In a sixteenth aspect, alone or in combination with one or more of the first through fifteenth aspects, the first availability indication is transmitted during a first paging cycle, and the second availability indication is transmitted during a second paging cycle.

In a seventeenth aspect, alone or in combination with one or more of the first through sixteenth aspects, the first availability indication and the second availability indication are associated with a same validity duration.

In an eighteenth aspect, alone or in combination with one or more of the first through seventeenth aspects, the same validity duration is associated with a common start point and a common end point for both the first availability indication and the second availability indication.

In a nineteenth aspect, alone or in combination with one or more of the first through eighteenth aspects, the first availability indication is associated with a first validity duration and the second availability indication is associated with a second validity duration.

In a twentieth aspect, alone or in combination with one or more of the first through nineteenth aspects, the first validity duration is based at least in part on a first time at which the first availability indication is transmitted, and the second validity duration is based at least in part on a second time at which the second availability indication is transmitted.

In a twenty-first aspect, alone or in combination with one or more of the first through twentieth aspects, the availability indication indicates whether the subset of TRS resources or the subset of TRS resource sets from the set of TRS resource sets are to be transmitted by the base station.

In a twenty-second aspect, alone or in combination with one or more of the first through twenty-first aspects, remaining TRS resources or remaining TRS resource sets are to be transmitted by the base station, and the remaining TRS resources or the remaining TRS resource sets are TRS resources or TRS resource sets, from the set of TRS resources or the set of TRS resource sets, that are not included in the subset of TRS resources or the subset of TRS resource sets.

In a twenty-third aspect, alone or in combination with one or more of the first through twenty-second aspects, remaining TRS resources or remaining TRS resource sets are not to be transmitted by the base station, and the remaining TRS resources or the remaining TRS resource sets are TRS resources or TRS resource sets, from the set of TRS resources or the set of TRS resource sets, that are not included in the subset of TRS resources or the subset of TRS resource sets.

In a twenty-fourth aspect, alone or in combination with one or more of the first through twenty-third aspects, process 800 includes transmitting an indication of whether the UE is to identify that the base station is to transmit or not transmit remaining TRS resources or remaining TRS resource sets, from the set of TRS resources or the set of TRS resource sets, that are not included in the availability indication.

In a twenty-fifth aspect, alone or in combination with one or more of the first through twenty-fourth aspects, process 800 includes transmitting a TRS using a TRS resource, from the set of TRS resources, or a TRS resource set from the set of TRS resource sets, based at least in part on transmitting the availability indication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
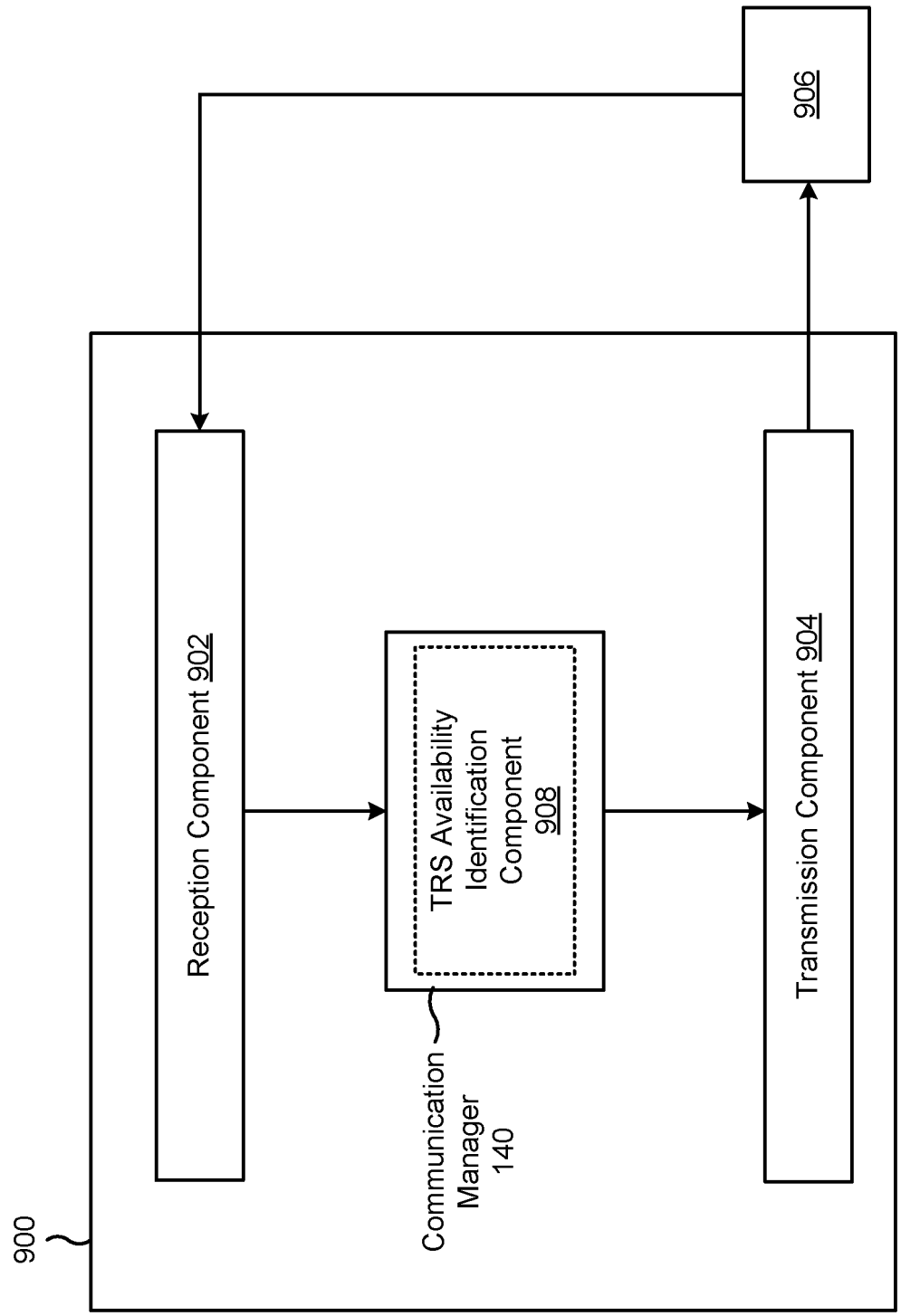
FIGS. 9 and 10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a TRS availability identification component 908, among other examples.

In some aspects, the apparatus 900 may be configured to perform one or more operations described herein in connection with FIGS. 5 and 6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive configurations of a set of TRS resources or a set of TRS resource sets. The reception component 902 may receive, from the base station, an availability indication associated with one or more TRS resources or one or more TRS resource sets from the set of TRS resources or the set of TRS resource sets, wherein the availability indication indicates whether TRS resources or TRS resource sets included in the one or more TRS resources or the one or more TRS resource sets are to be transmitted by the base station, and wherein the availability indication is associated with at least one of: one or more groups of TRS resources, associated with the set of TRS resources, or one or more groups of TRS resource sets associated with the set of TRS resource sets; or a subset of TRS resources, from the set of TRS resources, or a subset of TRS resource sets from the set of TRS resource sets.

The TRS availability identification component 908 may identify available TRS resources, from the set of TRS resources, or available TRS resource sets, from the set of TRS resource sets, based at least in part on the availability indication.

The reception component 902 may receive, from the base station, an indication of the one or more groups of TRS resources or the one or more groups of TRS resource sets.

The reception component 902 may receive, from the base station, one or more group configurations associated with the one or more groups of TRS resources or the one or more groups of TRS resource sets, wherein a group configuration, of the one or more group configurations, indicates identifiers of one or more TRS resources or one or more TRS resource sets included in a group associated with the group configuration.

The reception component 902 may receive, from the base station, an indication of whether the UE is to identify that the base station is to transmit or not transmit remaining TRS resources or remaining TRS resource sets, from the set of TRS resources or the set of TRS resource sets, that are not included in the availability indication.

The reception component 902 may receive, from the base station, a TRS using a TRS resource, from the set of TRS resources, or a TRS resource set from the set of TRS resource sets, based at least in part on the availability indication.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
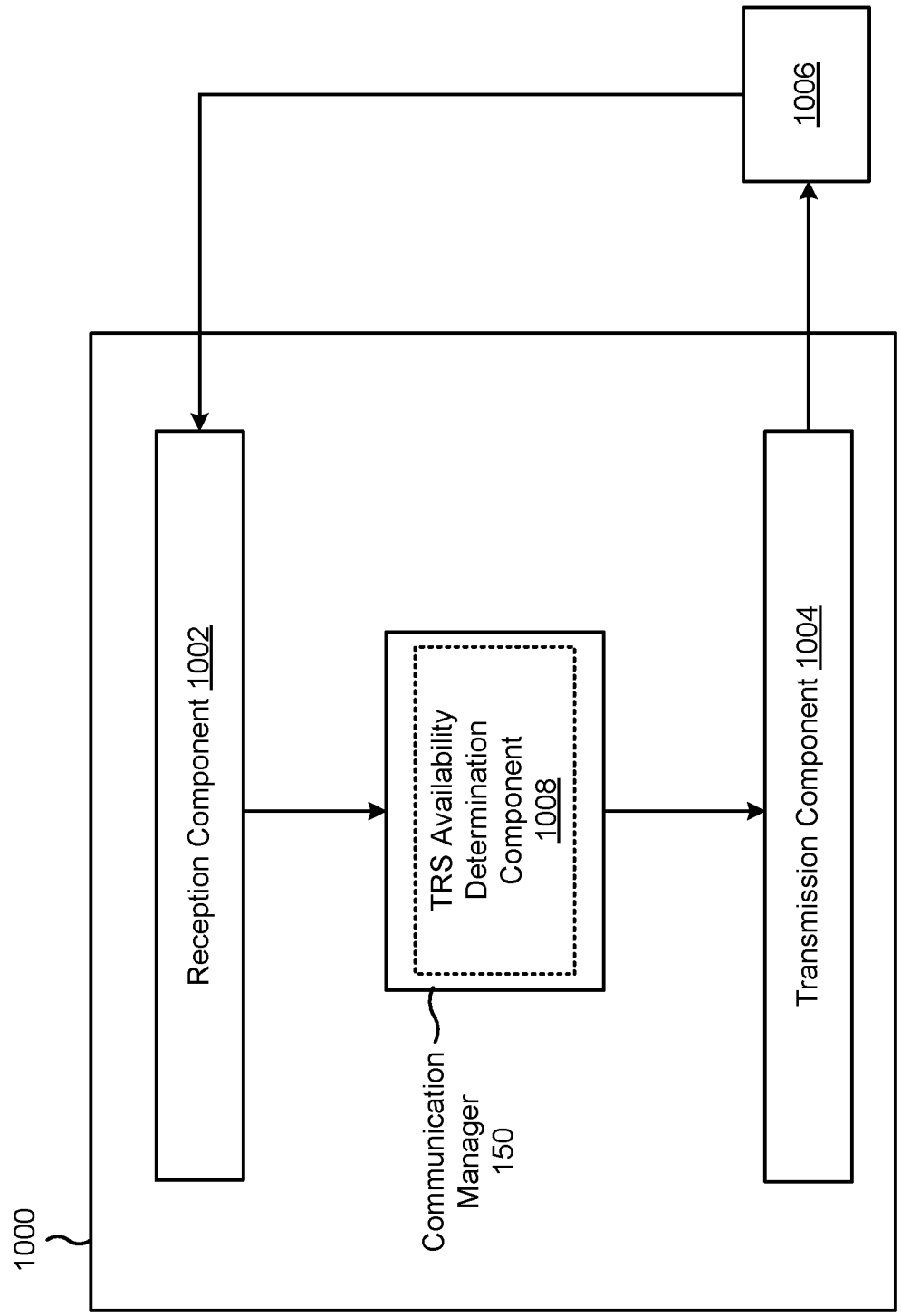

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a TRS availability determination component 1008, among other examples.

In some aspects, the apparatus 1000 may be configured to perform one or more operations described herein in connection with FIGS. 5 and 6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The transmission component 1004 may transmit configurations of a set of TRS resources or a set of TRS resource sets. The transmission component 1004 may transmit an availability indication associated with one or more TRS resources or one or more TRS resource sets from the set of TRS resources or the set of TRS resource sets, wherein the availability indication indicates whether TRS resources or TRS resource sets included in the one or more TRS resources or the one or more TRS resource sets are to be transmitted by the apparatus 1000, and wherein the availability indication is associated with at least one of: one or more groups of TRS resources, associated with the set of TRS resources, or one or more groups of TRS resource sets associated with the set of TRS resource sets; or a subset of TRS resources, from the set of TRS resources, or a subset of TRS resource sets from the set of TRS resource sets.

The TRS availability determination component 1008 may determine available TRS resources, from the set of TRS resources, or available TRS resource sets, from the set of TRS resource sets, that are to be transmitted by the apparatus 1000. The transmission component 1004 may transmit the availability indication indicating the available TRS resources or the available TRS resource sets.

The transmission component 1004 may transmit an indication of the one or more groups of TRS resources or the one or more groups of TRS resource sets.

The transmission component 1004 may transmit one or more group configurations associated with the one or more groups of TRS resources or the one or more groups of TRS resource sets, wherein a group configuration, of the one or more group configurations, indicates identifiers of one or more TRS resources or one or more TRS resource sets included in a group associated with the group configuration.

The transmission component 1004 may transmit an indication of whether the UE is to identify that the base station is to transmit or not transmit remaining TRS resources or remaining TRS resource sets, from the set of TRS resources or the set of TRS resource sets, that are not included in the availability indication.

The transmission component 1004 may transmit a TRS using a TRS resource, from the set of TRS resources, or a TRS resource set from the set of TRS resource sets, based at least in part on transmitting the availability indication.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving configurations of a set of tracking reference signal (TRS) resources or a set of TRS resource sets; and receiving an availability indication associated with one or more TRS resources or one or more TRS resource sets from the set of TRS resources or the set of TRS resource sets, wherein the availability indication indicates whether TRS resources or TRS resource sets included in the one or more TRS resources or the one or more TRS resource sets are to be transmitted by the base station, and wherein the availability indication is associated with at least one of: one or more groups of TRS resources, associated with the set of TRS resources, or one or more groups of TRS resource sets associated with the set of TRS resource sets; or a subset of TRS resources, from the set of TRS resources, or a subset of TRS resource sets from the set of TRS resource sets.

Aspect 2: The method of Aspect 1, wherein the availability indication is received via Layer 1 signaling.

Aspect 3: The method of any of Aspects 1-2, wherein the availability indication is associated with a paging signal.

Aspect 4: The method of any of Aspects 1-3, further comprising: receiving, from the base station, an indication of the one or more groups of TRS resources or the one or more groups of TRS resource sets.

Aspect 5: The method of Aspect 4, wherein the indication of the one or more groups of TRS resources or the one or more groups of TRS resource sets is included in the configuration of the set of TRS resources or the set of TRS resource sets.

Aspect 6: The method of any of Aspects 1-5, wherein the configuration indicates, for a TRS resource or a TRS resource set, an identifier of a group associated with the TRS resource or the TRS resource set.

Aspect 7: The method of any of Aspects 1-6, further comprising: receiving, from the base station, one or more group configurations associated with the one or more groups of TRS resources or the one or more groups of TRS resource sets, wherein a group configuration, of the one or more group configurations, indicates identifiers of one or more TRS resources or one or more TRS resource sets included in a group associated with the group configuration.

Aspect 8: The method of any of Aspects 1-7, wherein a quantity of TRS resources or TRS resource sets to be included in each group, of the one or more groups of TRS resources or the one or more groups of TRS resource sets, is defined, and wherein a group, of the one or more groups of TRS resources or the one or more groups of TRS resource sets, is formed based at least in part on the quantity and based at least in part on identifiers of the set of TRS resources or identifiers of the set of TRS resource sets.

Aspect 9: The method of Aspect 8, wherein a first group includes a first subset of TRS resources or TRS resource sets, from the set of TRS resources or the set of TRS resource sets, and a second group includes a second subset of TRS resources or TRS resource sets from the set of TRS resources or the set of TRS resource sets, wherein the first group and the second group both include the quantity of the TRS resources or the TRS resource sets, and wherein TRS resources or TRS resource sets included in the first group and the second group are based at least in part on an order of the identifiers of the set of TRS resources or an order of the identifiers of the set of TRS resource sets.

Aspect 10: The method of any of Aspects 1-9, wherein a group, of the one or more groups of TRS resources or the one or more groups of TRS resource sets, includes TRS resources or TRS resource sets that are associated with different quasi co-location (QCL) references.

Aspect 11: The method of any of Aspects 1-10, wherein the availability indication includes an indication for each group of the one or more groups of TRS resources or the one or more groups of TRS resource sets, and wherein an indication, for a group, indicates whether all TRS resources or all TRS resource sets included in the group are to be transmitted by the base station.

Aspect 12: The method of any of Aspects 1-11, wherein the availability indication is associated with multiple signals, and wherein each signal, of the multiple signals, indicates an availability associated with a group of the one or more groups of TRS resources or the one or more groups of TRS resource sets.

Aspect 13: The method of any of Aspects 1-12, wherein receiving the availability indication comprises: receiving, from the base station, a first availability indication associated with a first group of the one or more groups of TRS resources or the one or more groups of TRS resource sets; and receiving, from the base station, a second availability indication associated with a second group of the one or more groups of TRS resources or the one or more groups of TRS resource sets.

Aspect 14: The method of Aspect 13, wherein the first availability indication is received using a first set of time-frequency resources, and wherein the second availability indication is received using a second set of time-frequency resources.

Aspect 15: The method of any of Aspects 13-14, wherein the first availability indication indicates whether TRS resources or TRS resource sets, included in the first group, are to be transmitted by the base station; and wherein the second availability indication indicates whether TRS resources or TRS resource sets, included in the second group, are to be transmitted by the base station.

Aspect 16: The method of any of Aspects 13-15, wherein the first availability indication includes separate indications for each TRS resource or TRS resource set included in the first group; and wherein the second availability indication includes separate indications for each TRS resource or TRS resource set included in the second group.

Aspect 17: The method of any of Aspects 13-16, wherein the first availability indication is received during a first paging cycle, and wherein the second availability indication is received during a second paging cycle.

Aspect 18: The method of any of Aspects 13-17, wherein the first availability indication and the second availability indication are associated with a same validity duration.

Aspect 19: The method of Aspect 18, wherein the same validity duration is associated with a common start point and a common end point for both the first availability indication and the second availability indication.

Aspect 20: The method of any of Aspects 13-19, wherein the first availability indication is associated with a first validity duration and the second availability indication is associated with a second validity duration.

Aspect 21: The method of Aspect 20, wherein the first validity duration is based at least in part on a first time at which the first availability indication is received, and wherein the second validity duration is based at least in part on a second time at which the second availability indication is received.

Aspect 22: The method of any of Aspects 1-21, wherein the availability indication indicates whether the subset of TRS resources or the subset of TRS resource sets from the set of TRS resource sets are to be transmitted by the base station.

Aspect 23: The method of Aspect 22, wherein remaining TRS resources or remaining TRS resource sets are to be transmitted by the base station, wherein the remaining TRS resources or the remaining TRS resource sets are TRS resources or TRS resource sets, from the set of TRS resources or the set of TRS resource sets, that are not included in the subset of TRS resources or the subset of TRS resource sets.

Aspect 24: The method of any of Aspects 22-23, wherein remaining TRS resources or remaining TRS resource sets are not to be transmitted by the base station, wherein the remaining TRS resources or the remaining TRS resource sets are TRS resources or TRS resource sets, from the set of TRS resources or the set of TRS resource sets, that are not included in the subset of TRS resources or the subset of TRS resource sets.

Aspect 25: The method of any of Aspects 22-24, further comprising: receiving, from the base station, an indication of whether the UE is to identify that the base station is to transmit or not transmit remaining TRS resources or remaining TRS resource sets, from the set of TRS resources or the set of TRS resource sets, that are not included in the availability indication.

Aspect 26: The method of any of Aspects 1-25, further comprising: receiving, from the base station, a TRS using a TRS resource, from the set of TRS resources, or a TRS resource set from the set of TRS resource sets, based at least in part on the availability indication.

Aspect 27: A method of wireless communication performed by a base station, comprising: transmitting, to one or more user equipment (UEs), configurations of a set of tracking reference signal (TRS) resources or a set of TRS resource sets; and transmitting an availability indication associated with one or more TRS resources or one or more TRS resource sets from the set of TRS resources or the set of TRS resource sets, wherein the availability indication indicates whether TRS resources or TRS resource sets included in the one or more TRS resources or the one or more TRS resource sets are to be transmitted by the base station, and wherein the availability indication is associated with at least one of: one or more groups of TRS resources, associated with the set of TRS resources, or one or more groups of TRS resource sets associated with the set of TRS resource sets; or a subset of TRS resources, from the set of TRS resources, or a subset of TRS resource sets from the set of TRS resource sets.

Aspect 28: The method of Aspect 27, wherein the availability indication is transmitted via Layer 1 signaling.

Aspect 29: The method of any of Aspects 27-28, wherein the availability indication is associated with a paging signal.

Aspect 30: The method of any of Aspects 27-29, further comprising: transmitting an indication of the one or more groups of TRS resources or the one or more groups of TRS resource sets.

Aspect 31: The method of Aspect 30, wherein the indication of the one or more groups of TRS resources or the one or more groups of TRS resource sets is included in the configuration of the set of TRS resources or the set of TRS resource sets.

Aspect 32: The method of any of Aspects 27-31, wherein the configuration indicates, for a TRS resource or a TRS resource set, an identifier of a group associated with the TRS resource or the TRS resource set.

Aspect 33: The method of any of Aspects 27-32, further comprising: transmitting one or more group configurations associated with the one or more groups of TRS resources or the one or more groups of TRS resource sets, wherein a group configuration, of the one or more group configurations, indicates identifiers of one or more TRS resources or one or more TRS resource sets included in a group associated with the group configuration.

Aspect 34: The method of any of Aspects 27-33, wherein a quantity of TRS resources or TRS resource sets to be included in each group, of the one or more groups of TRS resources or the one or more groups of TRS resource sets, is defined, and wherein a group, of the one or more groups of TRS resources or the one or more groups of TRS resource sets, is formed based at least in part on the quantity and based at least in part on identifiers of the set of TRS resources or identifiers of the set of TRS resource sets.

Aspect 35: The method of Aspect 34, wherein a first group includes a first subset of TRS resources or TRS resource sets, from the set of TRS resources or the set of TRS resource sets, and a second group includes a second subset of TRS resources or TRS resource sets from the set of TRS resources or the set of TRS resource sets, wherein the first group and the second group both include the quantity of the TRS resources or the TRS resource sets, and wherein TRS resources or TRS resource sets included in the first group and the second group are based at least in part on an order of the identifiers of the set of TRS resources or an order of the identifiers of the set of TRS resource sets.

Aspect 36: The method of any of Aspects 27-35, wherein a group, of the one or more groups of TRS resources or the one or more groups of TRS resource sets, includes TRS resources or TRS resource sets that are associated with different quasi co-location (QCL) references.

Aspect 37: The method of any of Aspects 27-36, wherein the availability indication includes an indication for each group of the one or more groups of TRS resources or the one or more groups of TRS resource sets, and wherein an indication, for a group, indicates whether all TRS resources or all TRS resource sets included in the group are to be transmitted by the base station.

Aspect 38: The method of any of Aspects 27-37, wherein the availability indication is associated with multiple signals, and wherein each signal, of the multiple signals, indicates an availability associated with a group of the one or more groups of TRS resources or the one or more groups of TRS resource sets.

Aspect 39: The method of any of Aspects 27-38, wherein transmitting the availability indication comprises: transmitting a first availability indication associated with a first group of the one or more groups of TRS resources or the one or more groups of TRS resource sets; and transmitting a second availability indication associated with a second group of the one or more groups of TRS resources or the one or more groups of TRS resource sets.

Aspect 40: The method of Aspect 39, wherein the first availability indication is transmitted using a first set of time-frequency resources, and wherein the second availability indication is received using a second set of time-frequency resources.

Aspect 41: The method of any of Aspects 39-40, wherein the first availability indication indicates whether TRS resources or TRS resource sets, included in the first group, are to be transmitted by the base station; and wherein the second availability indication indicates whether TRS resources or TRS resource sets, included in the second group, are to be transmitted by the base station.

Aspect 42: The method of any of Aspects 39-41, wherein the first availability indication includes separate indications for each TRS resource or TRS resource set included in the first group; and wherein the second availability indication includes separate indications for each TRS resource or TRS resource set included in the second group.

Aspect 43: The method of any of Aspects 39-42, wherein the first availability indication is transmitted during a first paging cycle, and wherein the second availability indication is transmitted during a second paging cycle.

Aspect 44: The method of any of Aspects 39-43, wherein the first availability indication and the second availability indication are associated with a same validity duration.

Aspect 45: The method of Aspect 44, wherein the same validity duration is associated with a common start point and a common end point for both the first availability indication and the second availability indication.

Aspect 46: The method of any of Aspects 39-45, wherein the first availability indication is associated with a first validity duration and the second availability indication is associated with a second validity duration.

Aspect 47: The method of Aspect 46, wherein the first validity duration is based at least in part on a first time at which the first availability indication is transmitted, and wherein the second validity duration is based at least in part on a second time at which the second availability indication is transmitted.

Aspect 48: The method of any of Aspects 27-47, wherein the availability indication indicates whether the subset of TRS resources or the subset of TRS resource sets from the set of TRS resource sets are to be transmitted by the base station.

Aspect 49: The method of Aspect 48, wherein remaining TRS resources or remaining TRS resource sets are to be transmitted by the base station, wherein the remaining TRS resources or the remaining TRS resource sets are TRS resources or TRS resource sets, from the set of TRS resources or the set of TRS resource sets, that are not included in the subset of TRS resources or the subset of TRS resource sets.

Aspect 50: The method of any of Aspects 48-49, wherein remaining TRS resources or remaining TRS resource sets are not to be transmitted by the base station, wherein the remaining TRS resources or the remaining TRS resource sets are TRS resources or TRS resource sets, from the set of TRS resources or the set of TRS resource sets, that are not included in the subset of TRS resources or the subset of TRS resource sets.

Aspect 51: The method of any of Aspects 48-50, further comprising: transmitting an indication of whether the UE is to identify that the base station is to transmit or not transmit remaining TRS resources or remaining TRS resource sets, from the set of TRS resources or the set of TRS resource sets, that are not included in the availability indication.

Aspect 52: The method of any of Aspects 27-51, further comprising: transmitting a TRS using a TRS resource, from the set of TRS resources, or a TRS resource set from the set of TRS resource sets, based at least in part on transmitting the availability indication.

Aspect 53: An apparatus for wireless communication at a device, comprising a processor; memory coupled with the processor; and instructions stored in the memory and executable by the processor to cause the apparatus to perform the method of one or more of Aspects 1-26.

Aspect 54: A device for wireless communication, comprising a memory and one or more processors coupled to the memory, the one or more processors configured to perform the method of one or more of Aspects 1-26.

Aspect 55: An apparatus for wireless communication, comprising at least one means for performing the method of one or more of Aspects 1-26.

Aspect 56: A non-transitory computer-readable medium storing code for wireless communication, the code comprising instructions executable by a processor to perform the method of one or more of Aspects 1-26.

Aspect 57: A non-transitory computer-readable medium storing a set of instructions for wireless communication, the set of instructions comprising one or more instructions that, when executed by one or more processors of a device, cause the device to perform the method of one or more of Aspects 1-26.

Aspect 58: An apparatus for wireless communication at a device, comprising a processor; memory coupled with the processor; and instructions stored in the memory and executable by the processor to cause the apparatus to perform the method of one or more of Aspects 27-52.

Aspect 59: A device for wireless communication, comprising a memory and one or more processors coupled to the memory, the one or more processors configured to perform the method of one or more of Aspects 27-52.

Aspect 60: An apparatus for wireless communication, comprising at least one means for performing the method of one or more of Aspects 27-52.

Aspect 61: A non-transitory computer-readable medium storing code for wireless communication, the code comprising instructions executable by a processor to perform the method of one or more of Aspects 27-52.

Aspect 62: A non-transitory computer-readable medium storing a set of instructions for wireless communication, the set of instructions comprising one or more instructions that, when executed by one or more processors of a device, cause the device to perform the method of one or more of Aspects 27-52.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive configurations of a set of tracking reference signal (TRS) resource sets;
      receive an availability indication associated with one or more groups of TRS resource sets from the set of TRS resource sets, wherein:
         the availability indication includes an indication for each group of the one or more groups of TRS resource sets, and
         an indication, for a group, indicates whether all TRS resource sets included in the group are to be transmitted; and
      communicate with a network entity based at least in part on receiving the availability indication.

2. The UE of claim 1, wherein the availability indication is received via Layer 1 signaling.

3. The UE of claim 1, wherein the availability indication is associated with a paging signal.

4. The UE of claim 1, wherein the configuration indicates, for a TRS resource set, an identifier of a group associated with the TRS resource set.

5. The UE of claim 1, wherein the one or more processors are further configured to:
   receive an indication of the one or more groups of TRS resource sets.

6. The UE of claim 5, wherein the indication of the one or more groups of TRS resource sets is included in the configuration of the set of TRS resource sets.

7. The UE of claim 1, wherein a quantity of TRS resource sets to be included in each group, of the one or more groups of TRS resource sets, is defined, and
   wherein a group, of the one or more groups of TRS resource sets, is formed based at least in part on the quantity and based at least in part on identifiers of the set of TRS resource sets.

8. The UE of claim 7, wherein a first group includes a first subset of TRS resource sets, from the set of TRS resource sets, and a second group includes a second subset of TRS resource sets from the set of TRS resource sets,
   wherein the first group and the second group both include the quantity of the TRS resource sets, and
   wherein TRS resource sets included in the first group and the second group are based at least in part on an order of the identifiers of the set of TRS resource sets.

9. The UE of claim 1, wherein the availability indication is associated with multiple signals, and wherein each signal, of the multiple signals, indicates an availability associated with a group of the one or more groups of TRS resource sets.

10. A network entity for wireless communication, comprising:
    a memory; and
    one or more processors, coupled to the memory, configured to:
       transmit configurations of a set of tracking reference signal (TRS) resource sets intended for one or more user equipment (UEs); and
       transmit an availability indication associated with one or more groups of TRS resource sets from the set of TRS resource sets, wherein:
          the availability indication includes an indication for each group of the one or more groups of TRS resource sets, and
          an indication, for a group, indicates whether all TRS resource sets included in the group are to be transmitted.

11. The network entity of claim 10, wherein the configuration indicates, for a TRS resource set, an identifier of a group associated with the TRS resource set.

12. A method of wireless communication performed by a user equipment (UE), comprising:
    receiving configurations of a set of tracking reference signal (TRS) resource sets;
    receiving an availability indication associated with one or more groups of TRS resource sets from the set of TRS resource sets, wherein:
       the availability indication includes an indication for each group of the one or more groups of TRS resource sets, and
       an indication, for a group, indicates whether all TRS resource sets included in the group are to be transmitted; and
    communicating with a network entity based at least in part on receiving the availability indication.

13. The method of claim 12, wherein the availability indication is received via Layer 1 signaling.

14. The method of claim 12, wherein the availability indication is associated with a paging signal.

15. The method of claim 12, wherein the configuration indicates, for a TRS resource set, an identifier of a group associated with the TRS resource set.

16. The method of claim 12, further comprising:

receiving an indication of the one or more groups of TRS resource sets.

17. The method of claim 16, wherein the indication of the one or more groups of TRS resource sets is included in the configuration of the set of TRS resource sets.

18. The method of claim 12, wherein a quantity of TRS resource sets to be included in each group, of the one or more groups of TRS resource sets, is defined, and wherein a group, of the one or more groups of TRS resource sets, is formed based at least in part on the quantity and based at least in part on identifiers of the set of TRS resource sets.

19. The method of claim 18, wherein a first group includes a first subset of TRS resource sets, from the set of TRS resource sets, and a second group includes a second subset of TRS resource sets from the set of TRS resource sets, wherein the first group and the second group both include the quantity of the TRS resource sets, and wherein TRS resource sets included in the first group and the second group are based at least in part on an order of the identifiers of the set of TRS resource sets.

20. The method of claim 12, wherein the availability indication is associated with multiple signals, and wherein each signal, of the multiple signals, indicates an availability associated with a group of the one or more groups of TRS resource sets.

* * * * *